United States Patent
Salter et al.

(10) Patent No.: US 11,715,220 B1
(45) Date of Patent: Aug. 1, 2023

(54) METHOD AND DEVICE FOR DEPTH SENSOR POWER SAVINGS

(71) Applicant: Apple Inc., Cupertino, CA (US)

(72) Inventors: Thomas G. Salter, Foster City, CA (US); Anshu Kameswar Chimalamarri, San Francisco, CA (US)

(73) Assignee: APPLE INC

( * ) Notice: Subject to any disclaimer, the term of this patent is extended or adjusted under 35 U.S.C. 154(b) by 0 days.

(21) Appl. No.: 17/379,718

(22) Filed: Jul. 19, 2021

Related U.S. Application Data

(60) Provisional application No. 63/058,933, filed on Jul. 30, 2020.

(51) Int. Cl.
| | |
|---|---|
| *G06T 7/50* | (2017.01) |
| *G06T 19/00* | (2011.01) |
| *G01C 3/08* | (2006.01) |
| *G06T 15/10* | (2011.01) |
| *G06F 3/01* | (2006.01) |

(52) U.S. Cl.
CPC ............... *G06T 7/50* (2017.01); *G01C 3/08* (2013.01); *G06F 3/013* (2013.01); *G06T 15/10* (2013.01); *G06T 19/006* (2013.01)

(58) Field of Classification Search
CPC ........................................................ G06T 7/50
See application file for complete search history.

(56) References Cited

U.S. PATENT DOCUMENTS

| | | | |
|---|---|---|---|
| 9,851,787 B2 | 12/2017 | Latta et al. | |
| 10,168,785 B2 | 1/2019 | Molchanov et al. | |
| 10,302,764 B2 | 5/2019 | Price et al. | |
| 2017/0220119 A1 | 8/2017 | Potts et al. | |
| 2018/0374227 A1* | 12/2018 | Varekamp | G01S 17/894 |
| 2019/0049720 A1* | 2/2019 | Bardagjy | G01B 11/2536 |
| 2020/0319344 A1* | 10/2020 | Ronchini Ximenes | G01S 17/18 |

OTHER PUBLICATIONS

James Noraky et al., "Low Power Depth Estimation of Rigid Objects for Time-of-Flight Imaging," IEEE Transactions on Circuits and Systems for Video Technology, vol. 30, No. 6, pp. 1524-1534.

* cited by examiner

*Primary Examiner* — Shivang I Patel
(74) *Attorney, Agent, or Firm* — Fernando & Partners, LLP

(57) ABSTRACT

In one implementation, a method of activating a depth sensor is performed by a device including a depth sensor including a plurality of depth sensor elements, a display, one or more processors, and non-transitory memory. The method includes obtaining content to be displayed on the display in association with a physical environment. The method includes selecting a subset of the plurality of depth sensor elements. The method includes activating the subset of the plurality of depth sensor elements to obtain a depth map of the physical environment. The method includes displaying, on the display, at least a portion of the content based on the depth map of the physical environment.

19 Claims, 19 Drawing Sheets

700

At a first device including a depth sensor including a plurality of depth sensor elements, a display, one or more processors, and non-transitory memory:

Obtaining content to be displayed on the display in association with a physical environment ⸺710

Selecting a subset of the plurality of depth sensor elements ⸺720

Activating a subset of the plurality of depth sensor elements to obtain a depth map of the physical environment ⸺730

Displaying, on the display, at least a portion of the content based on the depth map of the physical environment ⸺740

Figure 7

METHOD AND DEVICE FOR DEPTH SENSOR POWER SAVINGS

CROSS-REFERENCE TO RELATED APPLICATIONS

This application claims priority to U.S. Provisional Patent App. No. 63/058,933, filed on Jul. 30, 2020, which is hereby incorporated by reference herein in its entirety.

TECHNICAL FIELD

The present disclosure generally relates to systems, methods, and devices for reducing the amount of power consumed by a depth sensor.

BACKGROUND

In various implementations, a virtual object in an extended reality (XR) environment is, from at least a particular perspective, located behind an opaque object. Accordingly, at least a portion of the virtual object should not be displayed in an image of the XR environment (e.g., it is hidden by the opaque object). In various implementations, to accurately determine the boundaries of the portion of the virtual object that should not be displayed, a depth sensor is used. However, in various implementations, a depth sensor consumes a large amount of power.

BRIEF DESCRIPTION OF THE DRAWINGS

So that the present disclosure can be understood by those of ordinary skill in the art, a more detailed description may be had by reference to aspects of some illustrative implementations, some of which are shown in the accompanying drawings.

FIG. 7 is a flowchart representation of a method of activating a depth sensor in accordance with some implementations.

Figure 1:
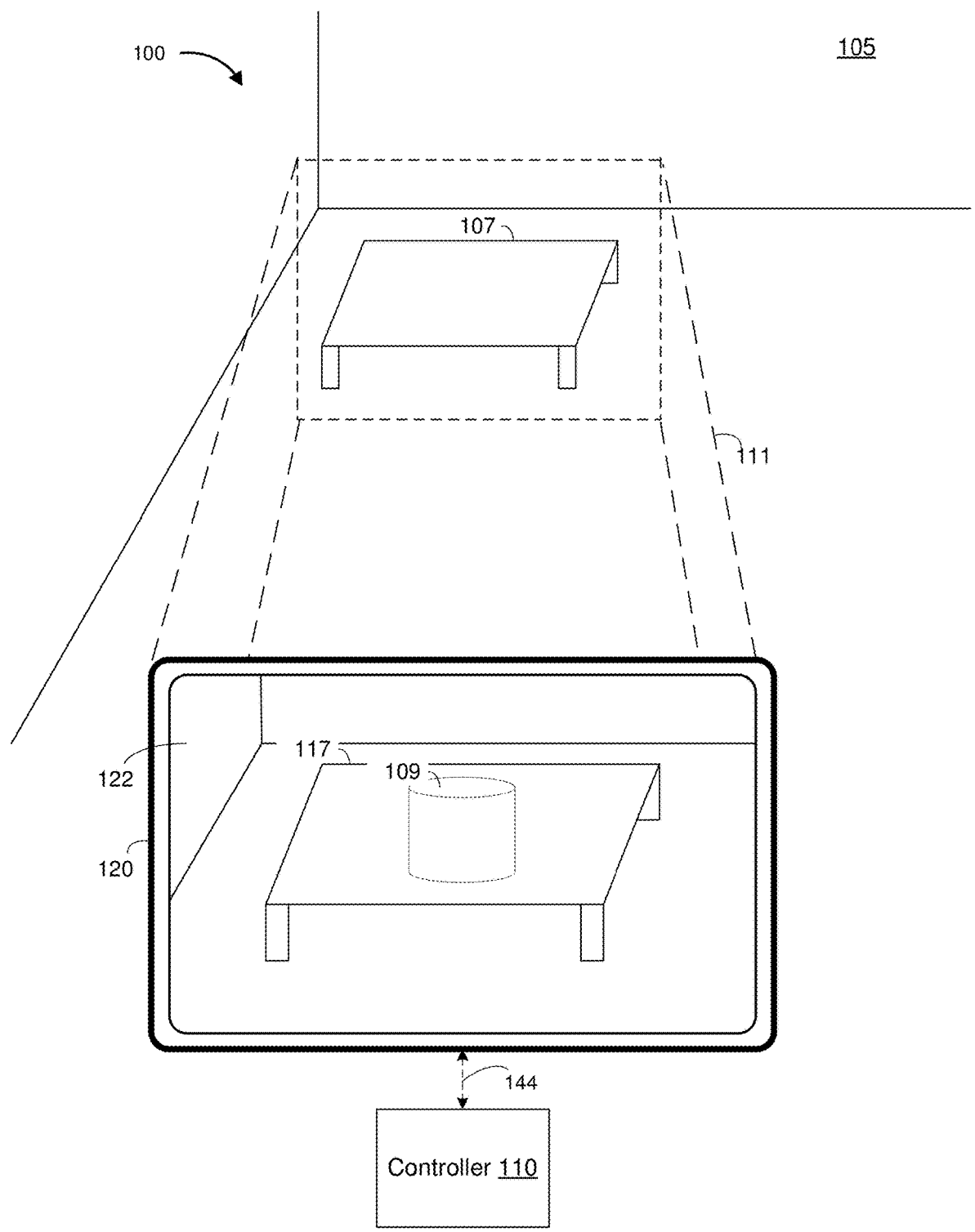
FIG. 1 is a block diagram of an example operating environment in accordance with some implementations.

In accordance with common practice the various features illustrated in the drawings may not be drawn to scale. Accordingly, the dimensions of the various features may be arbitrarily expanded or reduced for clarity. In addition, some of the drawings may not depict all of the components of a given system, method or device. Finally, like reference numerals may be used to denote like features throughout the specification and figures.

SUMMARY

Various implementations disclosed herein include devices, systems, and methods for activating a depth sensor. In various implementations, the method is performed by a device including a depth sensor including a plurality of depth sensor elements, a display, one or more processors, and non-transitory memory. The method includes obtaining content to be displayed on the display in association with a physical environment. The method includes selecting a subset of the plurality of depth sensor elements. The method includes activating the subset of the plurality of depth sensor elements to obtain a depth map of the physical environment. The method includes displaying, on the display, at least a portion of the content based on the depth map of the physical environment.

In accordance with some implementations, a device includes one or more processors, a non-transitory memory, and one or more programs; the one or more programs are stored in the non-transitory memory and configured to be executed by the one or more processors. The one or more programs include instructions for performing or causing performance of any of the methods described herein. In accordance with some implementations, a non-transitory computer readable storage medium has stored therein instructions, which, when executed by one or more processors of a device, cause the device to perform or cause performance of any of the methods described herein. In accordance with some implementations, a device includes: one or more processors, a non-transitory memory, and means for performing or causing performance of any of the methods described herein.

DESCRIPTION

Numerous details are described in order to provide a thorough understanding of the example implementations shown in the drawings. However, the drawings merely show some example aspects of the present disclosure and are therefore not to be considered limiting. Those of ordinary skill in the art will appreciate that other effective aspects and/or variants do not include all of the specific details described herein. Moreover, well-known systems, methods, components, devices, and circuits have not been described in exhaustive detail so as not to obscure more pertinent aspects of the example implementations described herein.

As noted above, in various implementations, at least a portion of a virtual object should not be displayed in an XR environment based on a physical environment (e.g., it is behind, hidden by, or occluded by an opaque object, which may be a physical object in the physical environment). In various implementations, to accurately determine the area of the portion of the virtual object that should not be displayed, a depth sensor is used to generate a depth map of the physical environment. However, in various implementations, a depth sensor consumes a large amount of power. In various implementations, the depth sensor includes a plurality of depth sensor elements. To reduce the amount of power used by the depth sensor, only a subset of the plurality of depth sensor elements are selected and activated to generate the depth map.

FIG. 1 is a block diagram of an example operating environment 100 in accordance with some implementations. While pertinent features are shown, those of ordinary skill in the art will appreciate from the present disclosure that various other features have not been illustrated for the sake of brevity and so as not to obscure more pertinent aspects of the example implementations disclosed herein. To that end, as a non-limiting example, the operating environment 100 includes a controller 110 and an electronic device 120.

In some implementations, the controller 110 is configured to manage and coordinate an XR experience for the user. In some implementations, the controller 110 includes a suitable combination of software, firmware, and/or hardware. The controller 110 is described in greater detail below with respect to FIG. 2. In some implementations, the controller 110 is a computing device that is local or remote relative to the physical environment 105. For example, the controller 110 is a local server located within the physical environment 105. In another example, the controller 110 is a remote server located outside of the physical environment 105 (e.g., a cloud server, central server, etc.). In some implementations, the controller 110 is communicatively coupled with the electronic device 120 via one or more wired or wireless communication channels 144 (e.g., BLUETOOTH, IEEE 802.11x, IEEE 802.16x, IEEE 802.3x, etc.). In another example, the controller 110 is included within the enclosure of the electronic device 120. In some implementations, the functionalities of the controller 110 are provided by and/or combined with the electronic device 120.

In some implementations, the electronic device 120 is configured to provide the XR experience to the user. In some implementations, the electronic device 120 includes a suitable combination of software, firmware, and/or hardware. According to some implementations, the electronic device 120 presents, via a display 122, XR content to the user while the user is physically present within the physical environment 105 that includes a table 107 within the field-of-view 111 of the electronic device 120. As such, in some implementations, the user holds the electronic device 120 in his/her hand(s). In some implementations, while providing XR content, the electronic device 120 is configured to display a virtual object (e.g., a virtual cylinder 109) and to enable video pass-through of the physical environment 105 (e.g., including a representation 117 of the table 107) on a display 122. The electronic device 120 is described in greater detail below with respect to FIG. 3.

According to some implementations, the electronic device 120 provides an XR experience to the user while the user is virtually and/or physically present within the physical environment 105.

In some implementations, the user wears the electronic device 120 on his/her head. For example, in some implementations, the electronic device includes a head-mounted system (HMS), head-mounted device (HMD), or head-mounted enclosure (HME). As such, the electronic device 120 includes one or more XR displays provided to display the XR content. For example, in various implementations, the electronic device 120 encloses the field-of-view of the user. In some implementations, the electronic device 120 is a handheld device (such as a smartphone or tablet) configured to present XR content, and rather than wearing the electronic device 120, the user holds the device with a display directed towards the field-of-view of the user and a camera directed towards the physical environment 105. In some implementations, the handheld device can be placed within an enclosure that can be worn on the head of the user. In some implementations, the electronic device 120 is replaced with an XR chamber, enclosure, or room configured to present XR content in which the user does not wear or hold the electronic device 120.

Figure 2:
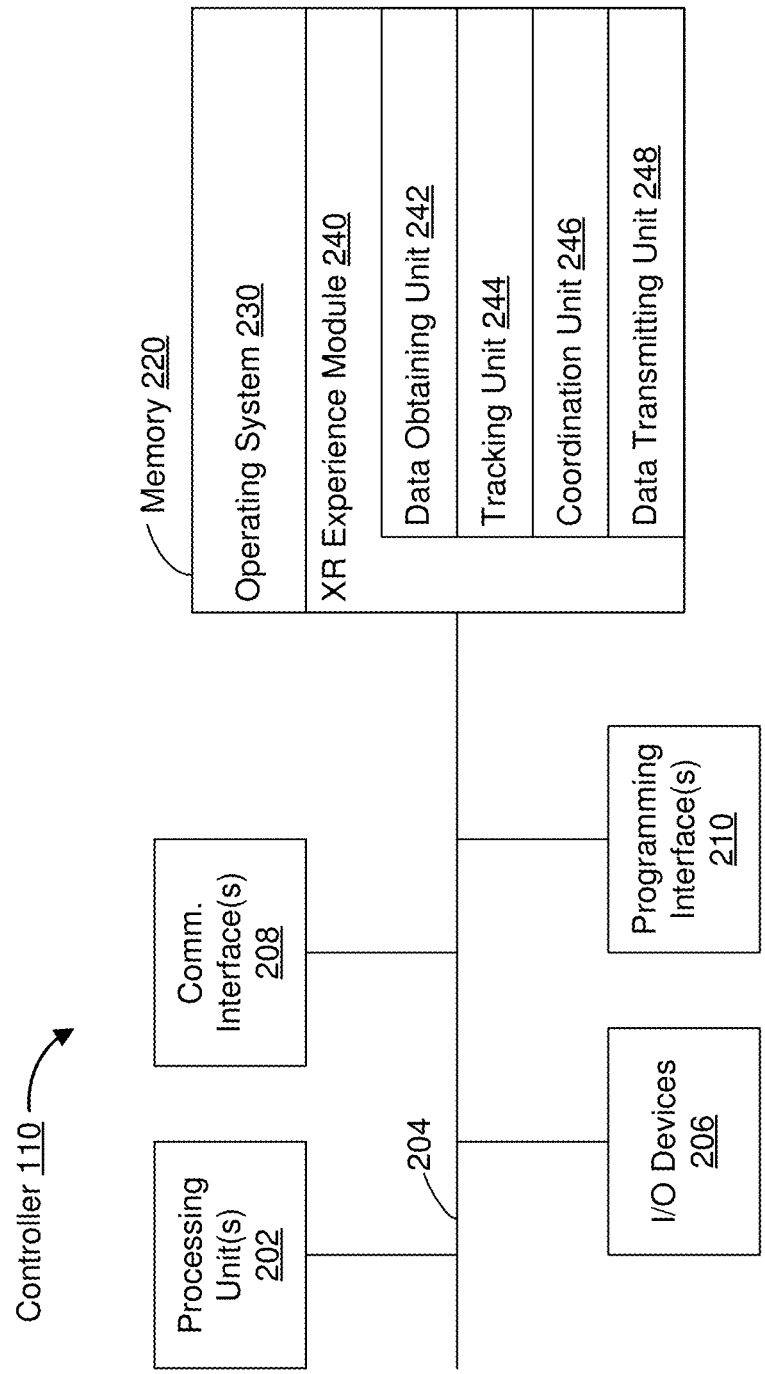
FIG. 2 is a block diagram of an example controller in accordance with some implementations.

FIG. 2 is a block diagram of an example of the controller 110 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the controller 110 includes one or more processing units 202 (e.g., microprocessors, application-specific integrated-circuits (ASICs), field-programmable gate arrays (FPGAs), graphics processing units (GPUs), central processing units (CPUs), processing cores, and/or the like), one or more input/output (I/O) devices 206, one or more communication interfaces 208 (e.g., universal serial bus (USB), FIREWIRE, THUNDERBOLT, IEEE 802.3x, IEEE 802.11x, IEEE 802.16x, global system for mobile communications (GSM), code division multiple access (CDMA), time division multiple access (TDMA), global positioning system (GPS), infrared (IR), BLUETOOTH, ZIGBEE, and/or the like type interface), one or more programming (e.g., I/O) interfaces 210, a memory 220, and one or more communication buses 204 for interconnecting these and various other components.

In some implementations, the one or more communication buses 204 include circuitry that interconnects and controls communications between system components. In some implementations, the one or more I/O devices 206 include at least one of a keyboard, a mouse, a touchpad, a joystick, one or more microphones, one or more speakers, one or more image sensors, one or more displays, and/or the like.

The memory 220 includes high-speed random-access memory, such as dynamic random-access memory (DRAM), static random-access memory (SRAM), double-data-rate random-access memory (DDR RAM), or other random-access solid-state memory devices. In some implementations, the memory 220 includes non-volatile memory, such as one or more magnetic disk storage devices, optical disk storage devices, flash memory devices, or other non-volatile solid-state storage devices. The memory 220 optionally includes one or more storage devices remotely located from the one or more processing units 202. The memory 220 comprises a non-transitory computer readable storage medium. In some implementations, the memory 220 or the non-transitory computer readable storage medium of the memory 220 stores the following programs, modules and data structures, or a subset thereof including an optional operating system 230 and an XR experience module 240.

The operating system 230 includes procedures for handling various basic system services and for performing hardware dependent tasks. In some implementations, the XR experience module 240 is configured to manage and coordinate one or more XR experiences for one or more users (e.g., a single XR experience for one or more users, or multiple XR experiences for respective groups of one or more users). To that end, in various implementations, the XR experience module 240 includes a data obtaining unit 242, a tracking unit 244, a coordination unit 246, and a data transmitting unit 248.

In some implementations, the data obtaining unit 242 is configured to obtain data (e.g., presentation data, interaction data, sensor data, location data, etc.) from at least the electronic device 120 of FIG. 1. To that end, in various implementations, the data obtaining unit 242 includes instructions and/or logic therefor, and heuristics and metadata therefor.

In some implementations, the tracking unit 244 is configured to map the physical environment 105 and to track the position/location of at least the electronic device 120 with respect to the physical environment 105 of FIG. 1. To that end, in various implementations, the tracking unit 244 includes instructions and/or logic therefor, and heuristics and metadata therefor.

In some implementations, the coordination unit 246 is configured to manage and coordinate the XR experience presented to the user by the electronic device 120. To that end, in various implementations, the coordination unit 246 includes instructions and/or logic therefor, and heuristics and metadata therefor.

In some implementations, the data transmitting unit 248 is configured to transmit data (e.g., presentation data, location data, etc.) to at least the electronic device 120. To that end, in various implementations, the data transmitting unit 248 includes instructions and/or logic therefor, and heuristics and metadata therefor.

Although the data obtaining unit 242, the tracking unit 244, the coordination unit 246, and the data transmitting unit 248 are shown as residing on a single device (e.g., the controller 110), it should be understood that in other implementations, any combination of the data obtaining unit 242, the tracking unit 244, the coordination unit 246, and the data transmitting unit 248 may be located in separate computing devices.

Moreover, FIG. 2 is intended more as functional description of the various features that may be present in a particular implementation as opposed to a structural schematic of the implementations described herein. As recognized by those of ordinary skill in the art, items shown separately could be combined and some items could be separated. For example, some functional modules shown separately in FIG. 2 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 3:
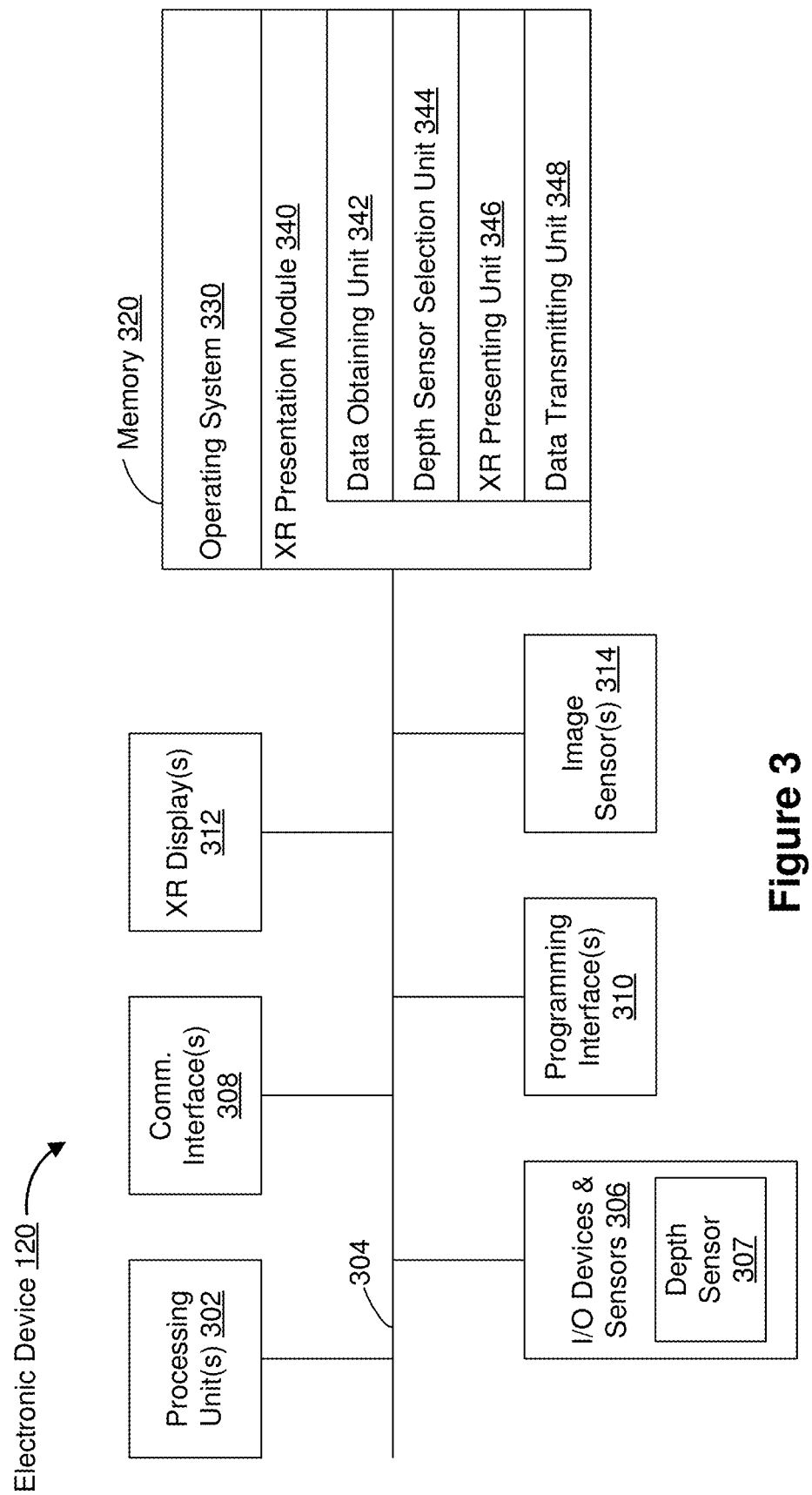
FIG. 3 is a block diagram of an example electronic device in accordance with some implementations.

FIG. 3 is a block diagram of an example of the electronic device 120 in accordance with some implementations. While certain specific features are illustrated, those skilled in the art will appreciate from the present disclosure that various other features have not been illustrated for the sake of brevity, and so as not to obscure more pertinent aspects of the implementations disclosed herein. To that end, as a non-limiting example, in some implementations the electronic device 120 includes one or more processing units 302 (e.g., microprocessors, ASICs, FPGAs, GPUs, CPUs, processing cores, and/or the like), one or more input/output (I/O) devices and sensors 306, one or more communication interfaces 308 (e.g., USB, FIREWIRE, THUNDERBOLT, IEEE 802.3x, IEEE 802.11x, IEEE 802.16x, GSM, CDMA, TDMA, GPS, IR, BLUETOOTH, ZIGBEE, and/or the like type interface), one or more programming (e.g., I/O) interfaces 310, one or more XR displays 312, one or more optional interior- and/or exterior-facing image sensors 314, a memory 320, and one or more communication buses 304 for interconnecting these and various other components.

In some implementations, the one or more communication buses 304 include circuitry that interconnects and controls communications between system components. In some implementations, the one or more I/O devices and sensors 306 include at least one of an inertial measurement unit (IMU), an accelerometer, a gyroscope, a thermometer, one or more physiological sensors (e.g., blood pressure monitor, heart rate monitor, blood oxygen sensor, blood glucose sensor, etc.), one or more microphones, one or more speakers, a haptics engine, a depth sensor 307 including a plurality of depth sensor elements (e.g., a structured light, a time-of-flight, or the like), and/or the like.

In some implementations, the one or more XR displays 312 are configured to provide the XR experience to the user. In some implementations, the one or more XR displays 312 correspond to holographic, digital light processing (DLP), liquid-crystal display (LCD), liquid-crystal on silicon (LCoS), organic light-emitting field-effect transitory (OLET), organic light-emitting diode (OLED), surface-conduction electron-emitter display (SED), field-emission display (FED), quantum-dot light-emitting diode (QD-LED), micro-electro-mechanical system (MEMS), and/or the like display types. In some implementations, the one or more XR displays 312 correspond to diffractive, reflective, polarized, holographic, etc. waveguide displays. For example, the electronic device 120 includes a single XR display. In another example, the electronic device includes an XR display for each eye of the user. In some implementations, the one or more XR displays 312 are capable of presenting MR and VR content.

In some implementations, the one or more image sensors 314 are configured to obtain image data that corresponds to at least a portion of the face of the user that includes the eyes of the user (any may be referred to as an eye-tracking camera). In some implementations, the one or more image sensors 314 are configured to be forward-facing so as to obtain image data that corresponds to the environment as would be viewed by the user if the electronic device 120 was not present (and may be referred to as a scene camera). The one or more optional image sensors 314 can include one or more RGB cameras (e.g., with a complimentary metal-oxide-semiconductor (CMOS) image sensor or a charge-coupled device (CCD) image sensor), one or more infrared (IR) cameras, one or more event-based cameras, and/or the like.

The memory 320 includes high-speed random-access memory, such as DRAM, SRAM, DDR RAM, or other random-access solid-state memory devices. In some implementations, the memory 320 includes non-volatile memory, such as one or more magnetic disk storage devices, optical disk storage devices, flash memory devices, or other non-volatile solid-state storage devices. The memory 320 optionally includes one or more storage devices remotely located from the one or more processing units 302. The memory 320 comprises a non-transitory computer readable storage medium. In some implementations, the memory 320 or the non-transitory computer readable storage medium of the memory 320 stores the following programs, modules and data structures, or a subset thereof including an optional operating system 330 and an XR presentation module 340.

The operating system 330 includes procedures for handling various basic system services and for performing hardware dependent tasks. In some implementations, the XR presentation module 340 is configured to present XR content to the user via the one or more XR displays 312. To that end, in various implementations, the XR presentation module 340 includes a data obtaining unit 342, a depth sensor selection unit 344, an XR presenting unit 346, and a data transmitting unit 348.

In some implementations, the data obtaining unit 342 is configured to obtain data (e.g., presentation data, interaction data, sensor data, location data, etc.) from at least the controller 110 of FIG. 1. To that end, in various implementations, the data obtaining unit 342 includes instructions and/or logic therefor, and heuristics and metadata therefor.

In some implementations, the depth sensor selection unit 344 is configured to select a subset of the plurality of depth sensor elements of the depth sensor 307 and activate the subset of the plurality of depth sensor elements to generate a depth map of physical environment. To that end, in various implementations, the depth sensor selection unit 344 includes instructions and/or logic therefor, and heuristics and metadata therefor.

In some implementations, the XR presenting unit 346 is configured to display, via the one or more XR displays 312, at least portion of a virtual object based on the depth map of the physical environment. To that end, in various implementations, the XR presenting unit 346 includes instructions and/or logic therefor, and heuristics and metadata therefor.

In some implementations, the data transmitting unit 348 is configured to transmit data (e.g., presentation data, location data, etc.) to at least the controller 110. In some implementations, the data transmitting unit 348 is configured to transmit authentication credentials to the electronic device. To that end, in various implementations, the data transmitting unit 348 includes instructions and/or logic therefor, and heuristics and metadata therefor.

Although the data obtaining unit 342, the depth sensor selection unit 344, the XR presenting unit 346, and the data transmitting unit 348 are shown as residing on a single device (e.g., the electronic device 120), it should be understood that in other implementations, any combination of the data obtaining unit 342, the depth sensor selection unit 344, the XR presenting unit 346, and the data transmitting unit 348 may be located in separate computing devices.

Moreover, FIG. 3 is intended more as a functional description of the various features that could be present in a particular implementation as opposed to a structural schematic of the implementations described herein. As recognized by those of ordinary skill in the art, items shown separately could be combined and some items could be separated. For example, some functional modules shown separately in FIG. 3 could be implemented in a single module and the various functions of single functional blocks could be implemented by one or more functional blocks in various implementations. The actual number of modules and the division of particular functions and how features are allocated among them will vary from one implementation to another and, in some implementations, depends in part on the particular combination of hardware, software, and/or firmware chosen for a particular implementation.

Figure 4A:
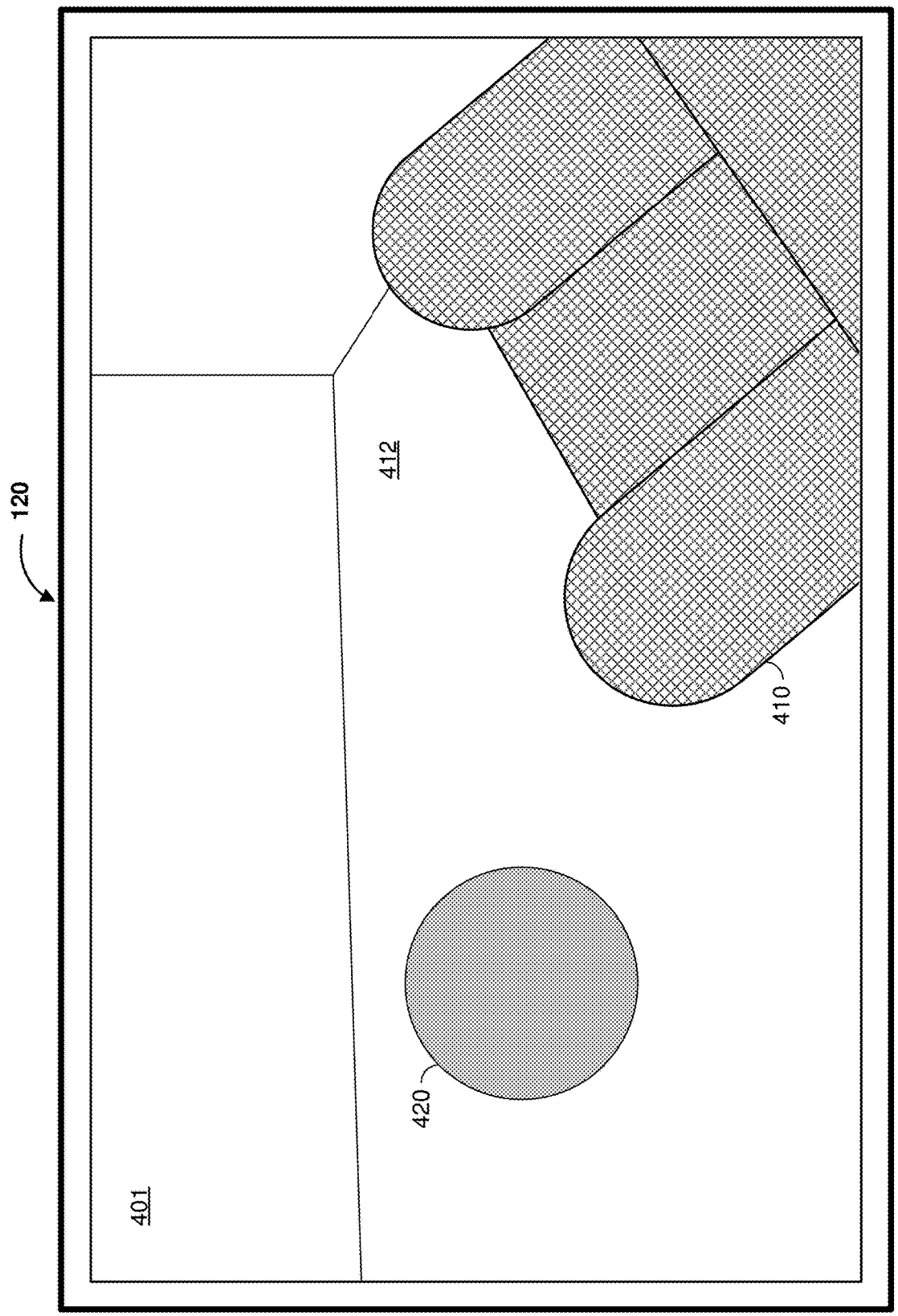
FIGS. 4A-4D illustrate the electronic device of FIG. 3 displaying images of an XR environment in accordance with some implementations.

FIG. 4A illustrates the electronic device 120 of FIG. 1 displaying a first image of an XR environment 401. The first image of the XR environment 401 represents the XR environment at a first time. The XR environment is based on a physical environment including a chair in a room having a floor. Accordingly, the first image of the XR environment 401 includes a representation of the chair 410 and a representation of the floor 412.

The XR environment further includes a virtual ball on the floor. Accordingly, the first image of the XR environment 401 includes a representation of the virtual ball 420 on the representation of the floor 412.

Figure 4B:
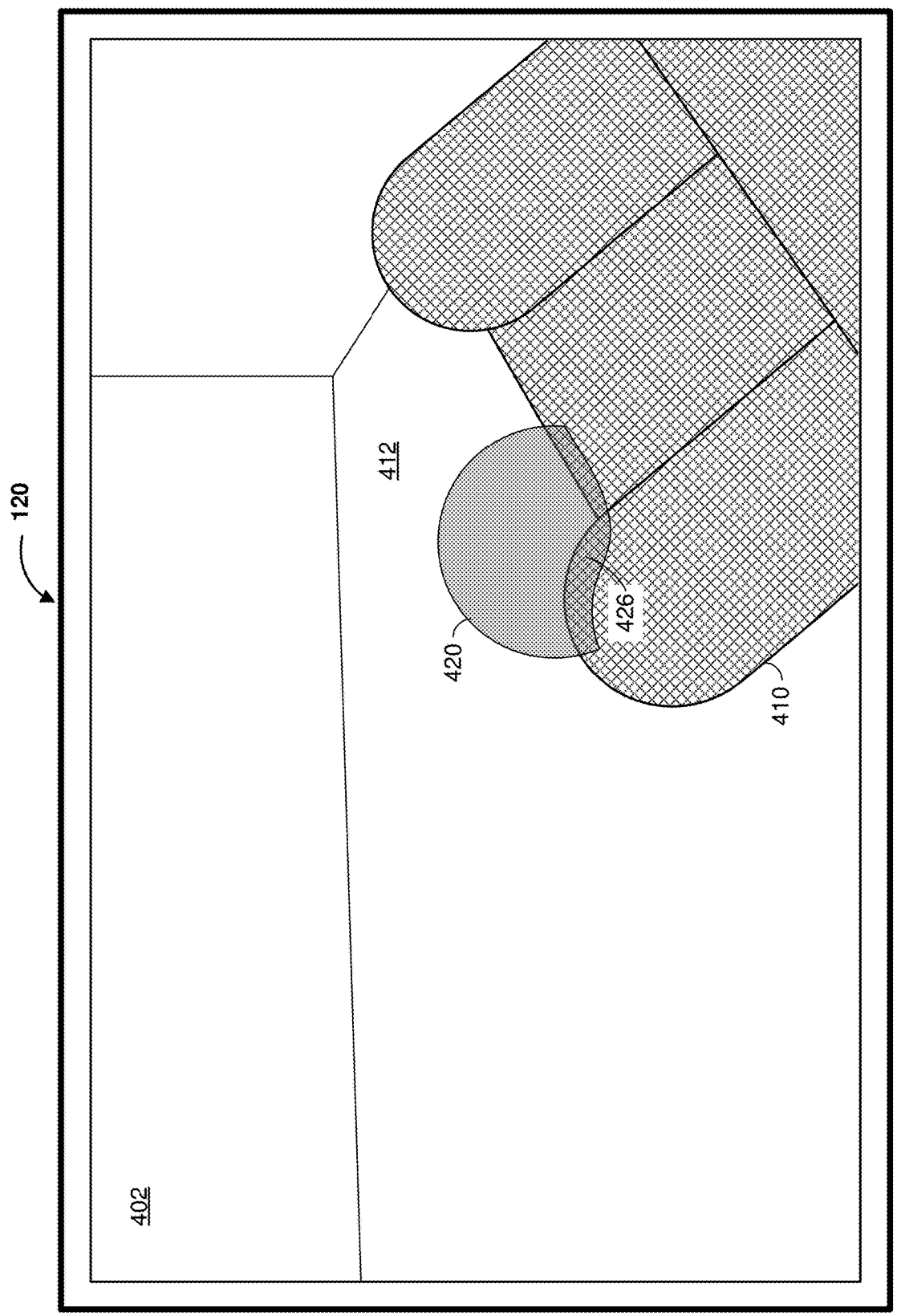

FIG. 4B illustrates the electronic device 120 of FIG. 1 displaying a second image of the XR environment 402. The second image of the XR environment 402 represents the XR environment at a second time in which, as compared to the first time, the virtual ball has moved to a location in which a portion of the virtual ball is, at least from the perspective of the second image of the XR environment 402, behind the chair.

Accordingly, a portion of the virtual ball 420 is not displayed. In the second image of the XR environment 402, the portion of the virtual ball that is not displayed is underestimated, resulting in under-occlusion in which a portion of the virtual ball 426 is visible through the representation of the chair 410.

Figure 4C:
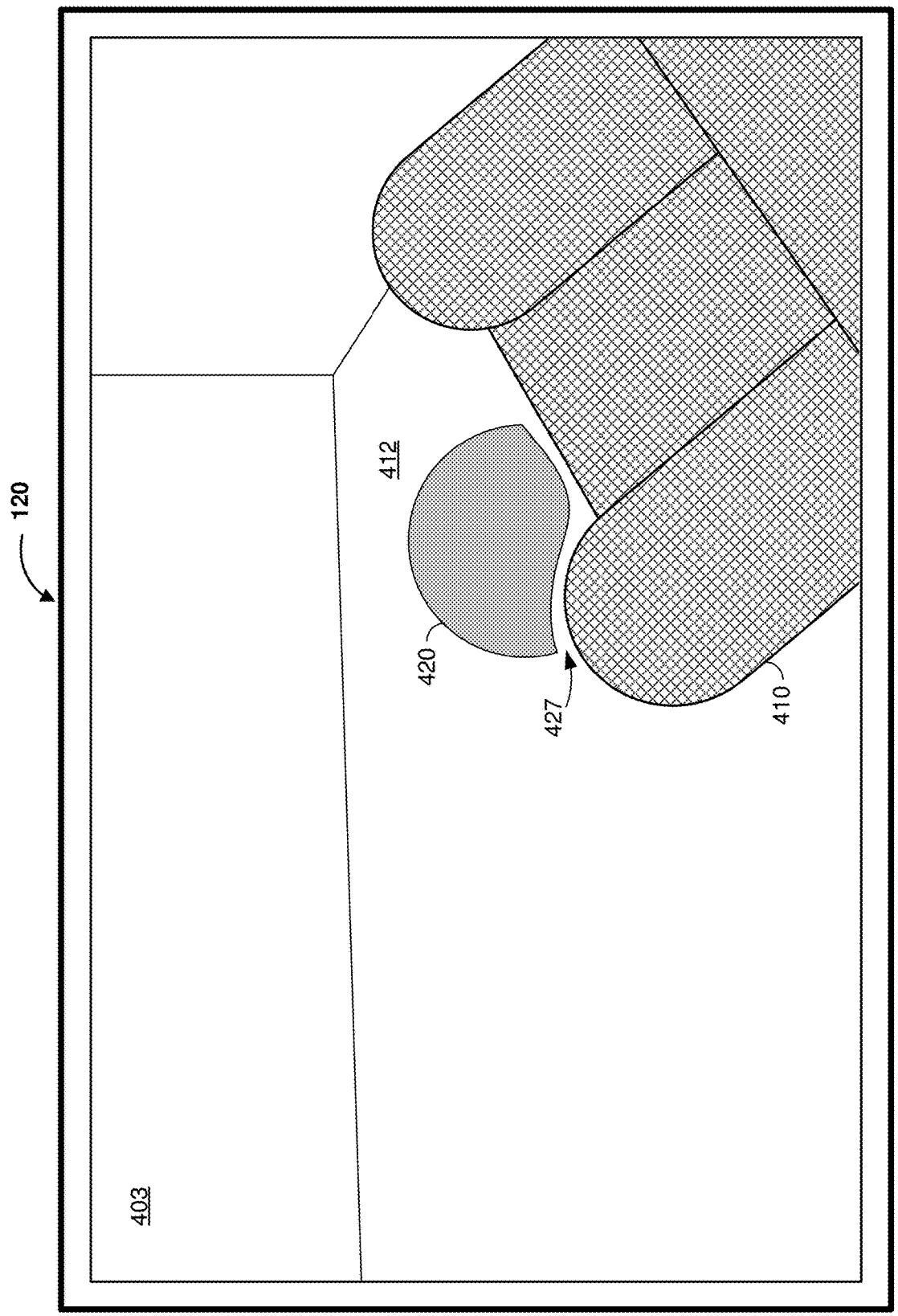

FIG. 4C illustrates the electronic device 120 of FIG. 1 displaying a third image of the XR environment 403. The third image of the XR environment 403 represents the XR environment at the second time in which, as compared to the first time, the virtual ball has moved to a location in which a portion of the virtual ball is, at least from the perspective of the third image of the XR environment 403, behind the chair.

Accordingly, a portion of the virtual ball is not displayed as part of the representation of the virtual ball 420. In the third image of the XR environment 403, the portion of the virtual ball that is not displayed is overestimated, resulting in over-occlusion in which a gap 427 is displayed between the representation of the virtual ball 420 and the representation of the chair 410.

Figure 4D:
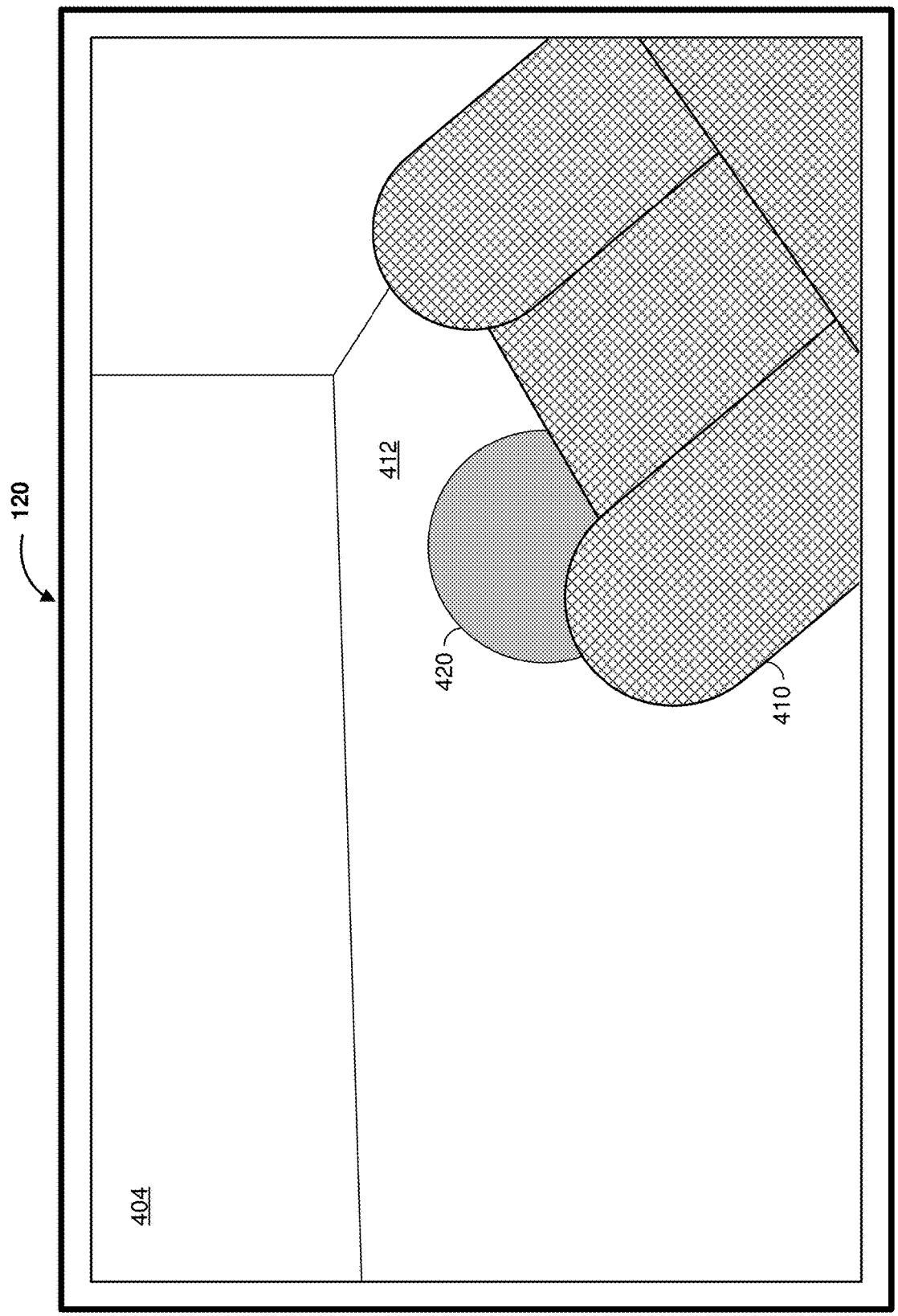

FIG. 4D illustrates the electronic device 120 of FIG. 1 displaying a fourth image of the XR environment 404. The fourth image of the XR environment 404 represents the XR environment at the second time in which, as compared to the first time, the virtual ball has moved to a location in which a portion of the virtual ball is, at least from the perspective of the fourth image of the XR environment 404, behind the chair.

Accordingly, a portion of the virtual ball is not displayed as part of the representation of the virtual ball 420. In the fourth image of the XR environment 404, the portion of the virtual ball that is not displayed is correctly estimated, resulting in realistic occlusion in which no portion of the representation of the virtual ball 420 is visible through the representation of the chair 410 and there is no gap between the representation of the virtual ball 420 and the representation of the chair 410.

Figure 5A:
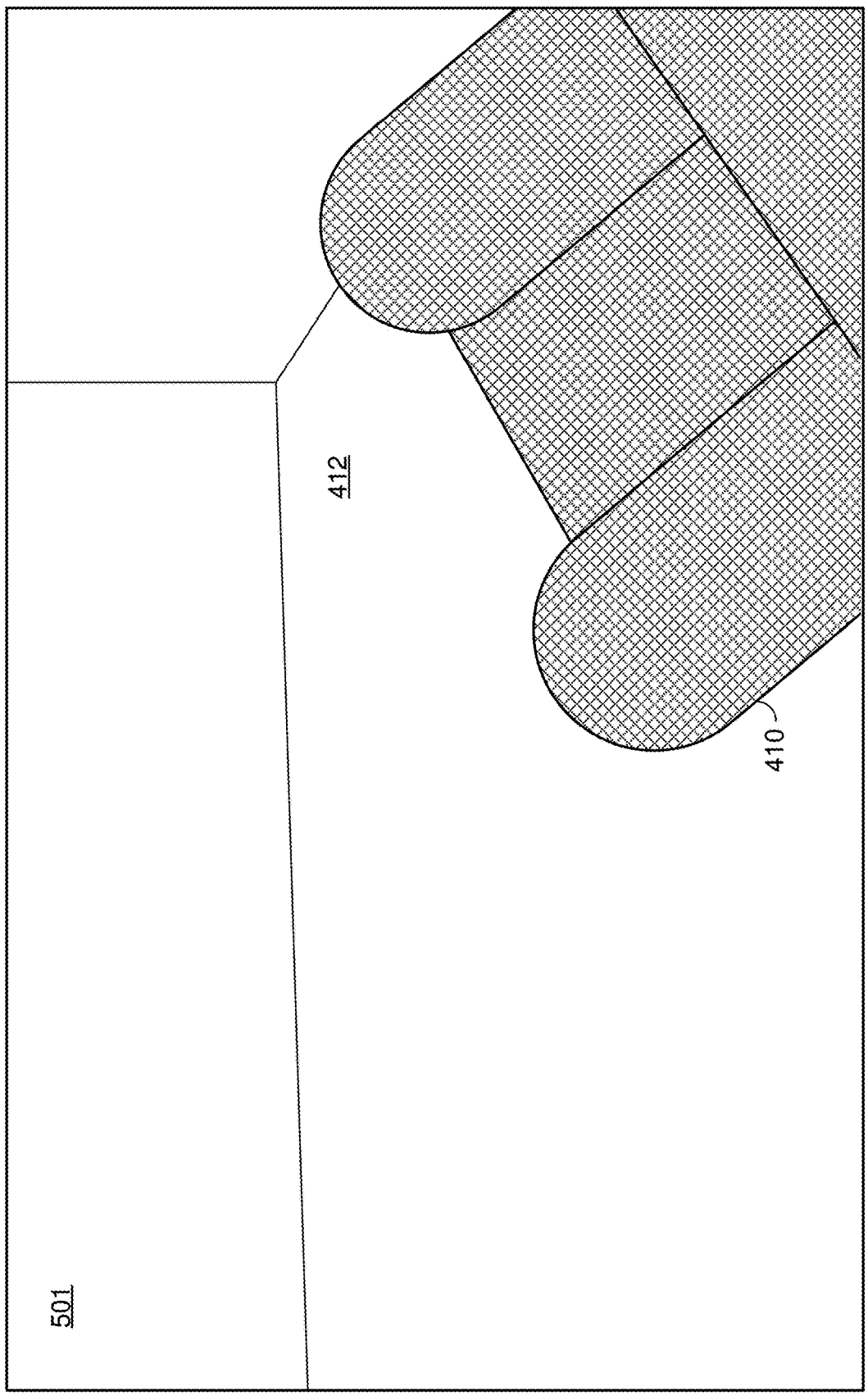
FIG. 5A illustrates an image of the physical environment upon which the XR environment of FIGS. 4A-4D is based.

FIG. 5A illustrates an image of the physical environment 501 upon which the XR environment of FIGS. 4A-4D is based. The image of the physical environment 501 includes the representation of the chair 410 and the representation of the floor 412.

In various implementations, the image of the physical environment 501 includes an m×n matrix of pixels. Each pixel is associated with a respective pixel location defined by a respective row and respective column of the matrix. Each pixel is further associated with a respective pixel value. In various implementations, the pixel value is a single value, e.g., ranging from 0 to 255. In various implementations, the pixel value is an RGB triplet including a red value, green value, and blue value.

Figure 5B:
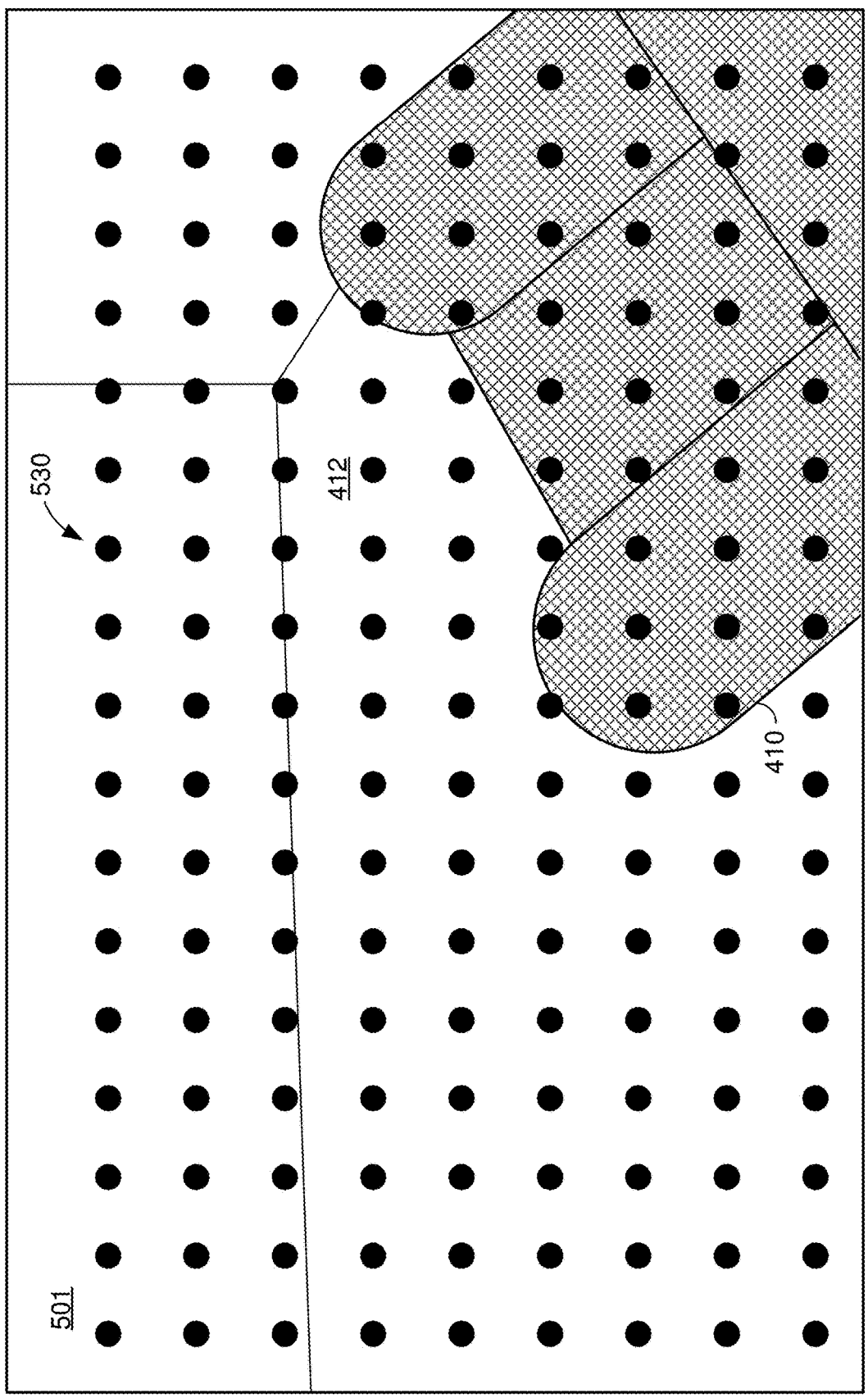
FIG. 5B illustrates the image of the physical environment of FIG. 5A with a representation of a sparse depth map overlaid thereon.

FIG. 5B illustrates the image of the physical environment 501 of FIG. 5A with a representation of a sparse depth map 530 overlaid thereon. The sparse depth map includes a plurality of depth elements (represented by black circles in FIG. 5B), each associated with a respective pixel location of the image of the physical environment 501 and a respective depth. The sparse depth map includes a depth for a number (but not all) of the pixels of the image of the physical environment 501. In various implementations, the sparse depth map is generated by using a depth sensor, such as a 3D scanner or LIDAR scanner. In various implementations, the depth sensor includes a plurality of depth sensor elements and each of the depth elements corresponds to a respective depth sensor element.

Figure 5C:
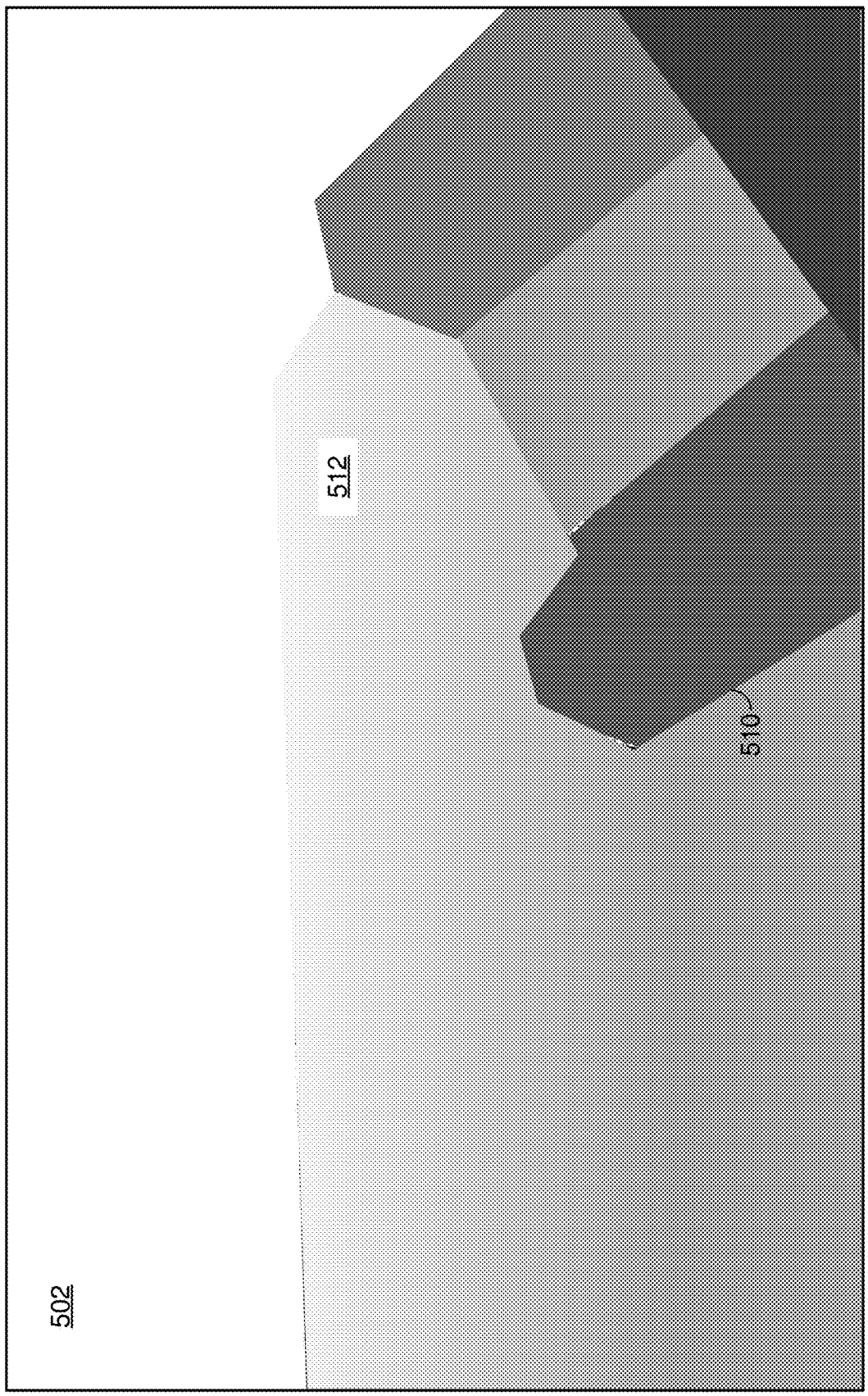
FIG. 5C illustrates a first dense depth map for the image of the physical environment of FIG. 5A.

FIG. 5C illustrates a first dense depth map 502 for the image of the physical environment 501 of FIG. 5A. The first dense depth map 502 includes a depth for each pixel of the image of the physical environment 501. FIG. 5C illustrates the depth for each pixel of the image of the physical environment 501 in grayscale, where lighter colors correspond to greater depths. Accordingly, the region of the first dense depth map corresponding to the floor 512 is lighter than the region of the first dense depth map corresponding to the chair 510. Further, the region of the first dense depth map corresponding to floor 512 trends lighter further from the camera (or depth sensor) towards the wall. Further, various regions of the first dense depth map 502 corresponding to different portions of the chair are different intensities, with the back of the chair being darkest, the left arm of the chair being lighter, and the seat of the chair being lightest (but still darker than the region of the first dense depth map corresponding to the floor 512).

In various implementations, the first dense depth map 502 is generated from the sparse depth map using interpolation or other techniques. In various implementations, the first dense depth map 502 is generated from the sparse depth map using the image of the physical environment 501 or a mesh model of the physical environment as guidance.

Notably, due to the low resolution of the sparse depth map (of which the representation of the sparse depth map 530 is shown in FIG. 5B), the edges of the region of the first dense depth map corresponding to the chair 510 poorly correspond to the edges of the region occupied by the representation of the chair 410 in the image of the physical environment 501.

Figure 5D:
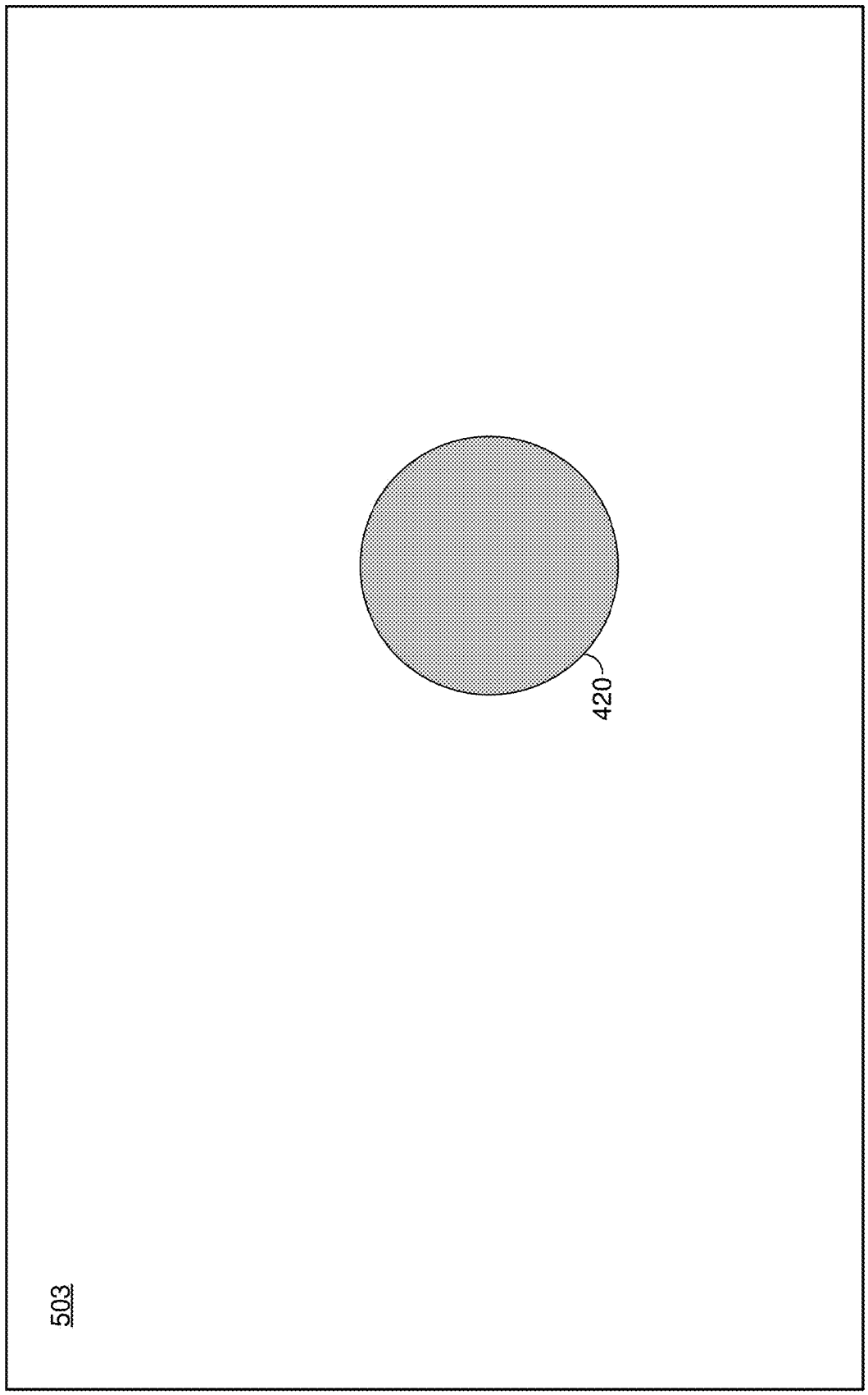
FIG. 5D illustrates an image of a virtual ball rendered at the same location as in FIGS. 4B-4D.

FIG. 5D illustrates an image of a virtual ball 503 rendered at the same location as in FIGS. 4B-4D. In various implementations, the image of the virtual ball 503 includes an m×n matrix of pixels. Each pixel is associated with a respective pixel location defined by a respective row and respective column of the matrix. Each pixel is further associated with a respective pixel value. In various implementations, the pixel value is a single value, e.g., ranging from 0 to 255. In various implementations, the pixel value is an RGB triplet including a red value, green value, and blue value. In various implementations, the pixel value is an RGBA set including a red value, green value, blue value, and transparency value. In various implementations, pixels corresponding to regions without content include a transparency value indicating complete transparency (e.g., an alpha value of 0).

Figure 5E:
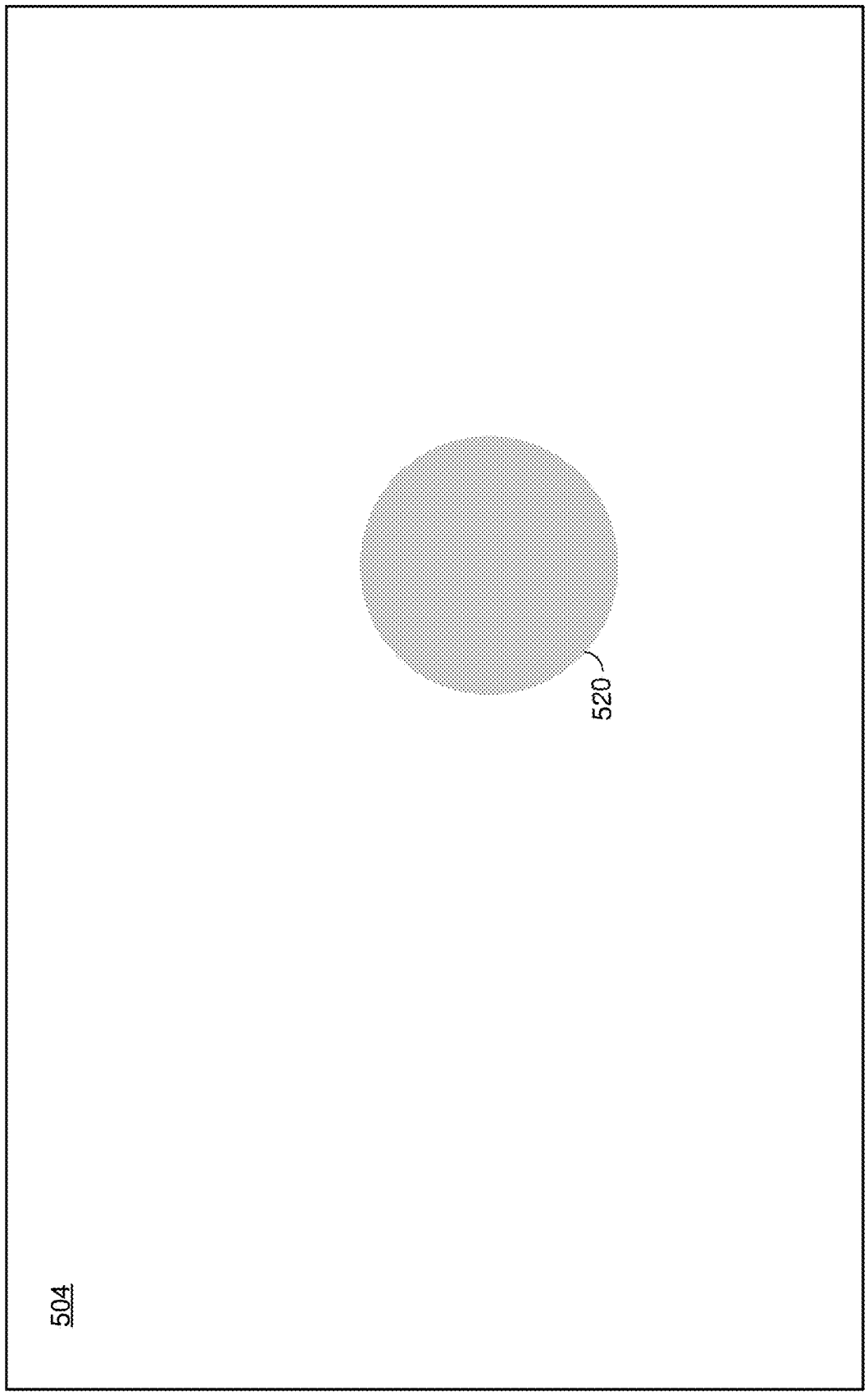
FIG. 5E illustrates a second dense depth map for the virtual ball of FIG. 5D.

FIG. 5E illustrates a second dense depth map 504 for the virtual ball. The second dense depth map 504 includes a depth value for each pixel of the image of the virtual ball 503 including content. In various implementations, the second depth map 504 includes a placeholder value (e.g., 0, NaN, or infinity) for pixels of the image not including content. FIG. 5E illustrates the depth for each pixel of the image of the virtual ball 503 in grayscale, where lighter colors correspond to greater depths. Accordingly, the region of the second dense depth map 504 corresponding to the virtual ball 520 is darker than the remainder of the second dense depth map 504 (but not as dark as the region of the first dense depth map 502 corresponding to the chair 510).

Figure 5F:
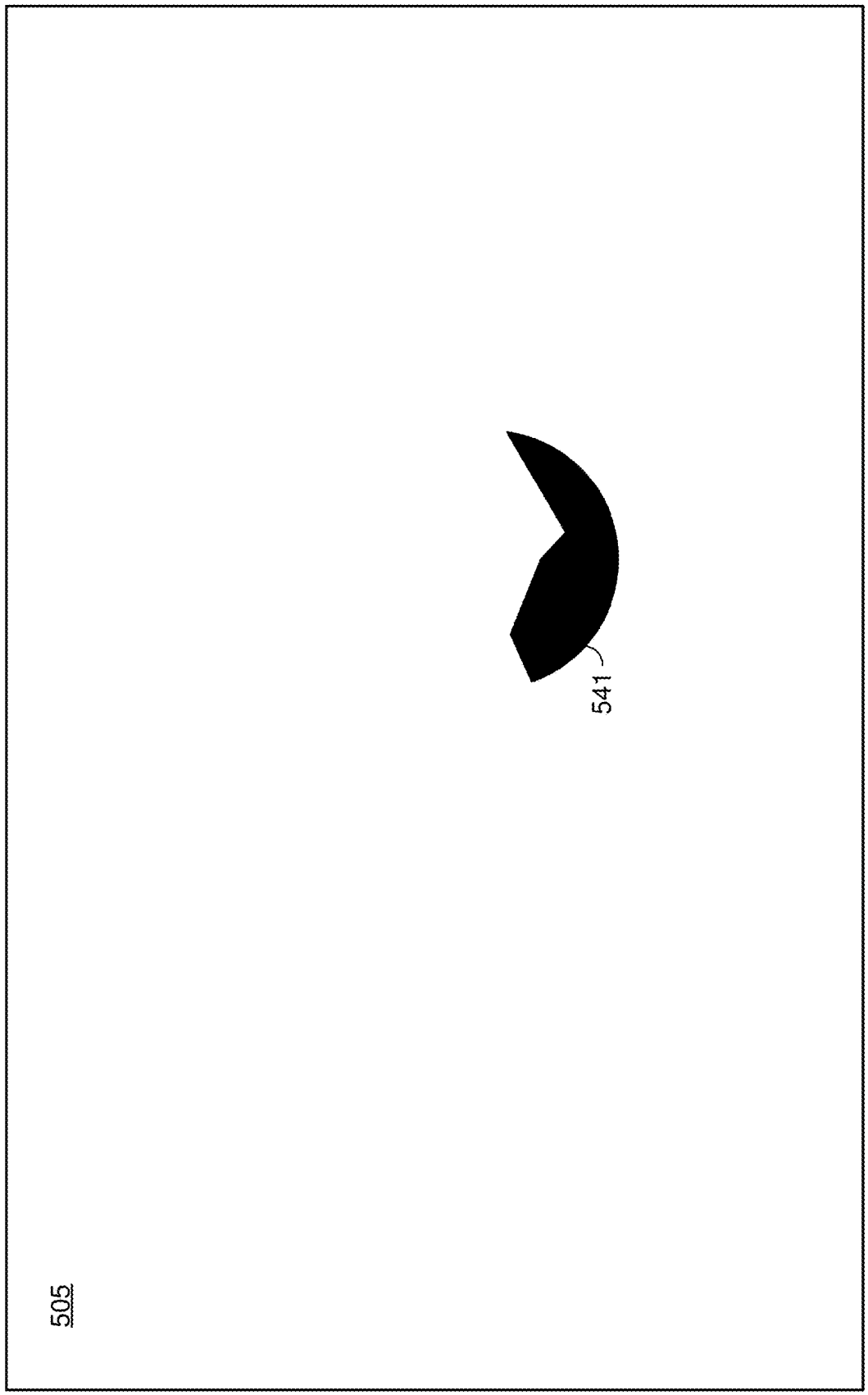
FIG. 5F illustrates an occlusion map based on the first dense depth map of FIG. 5D and the second dense depth map of FIG. 5F.

FIG. 5F illustrates an occlusion map 505 based on the first dense depth map 502 of FIG. 5C and the second dense depth map 504 of FIG. 5E. In various implementations, the occlusion map 505 includes an m×n matrix of pixels. Each pixel is associated with a respective pixel location defined by a respective row and respective column of the matrix. Each pixel is further associated with a respective pixel value. In various implementations, the pixel value is either 0 or 1. In various implementations, the pixel value ranges from 0 to 1.

The occlusion map 505 includes an occlusion region 541 estimating pixel locations at which the virtual ball is occluded by objects in the physical environment.

In various implementations, each pixel of the occlusion map 505 is set to a value of 0 if the pixel value (corresponding to depth, not closeness) of the corresponding pixel of the second dense depth map 504 is less than the pixel value of the corresponding pixel of the first dense depth map 502; otherwise, the pixel value is set to a value of 1. Alternatively, each pixel of the occlusion map 505 is set to a value of 0 if the pixel value (corresponding to closeness, not depth) of the corresponding pixel of the second dense depth map 504 is greater than the pixel value of the corresponding pixel of the first dense depth map 502; otherwise, the pixel value is set to a value of 1.

In various implementations, each pixel of the occlusion map 505 is set to a value of 0 if the pixel value (corresponding to depth, not closeness) of the corresponding pixel of the second dense depth map 504 is the placeholder value or less than the pixel value of the corresponding pixel of the first dense depth map 502; otherwise, the pixel value is set to a value of 1. Alternatively, each pixel of the occlusion map 505 is set to a value of 0 if the pixel value (corresponding to closeness, not depth) of the corresponding pixel of the second dense depth map 504 is the placeholder value or greater than the pixel value of the corresponding pixel of the first dense depth map 502; otherwise, the pixel value is set to a value of 1.

Figure 5G:
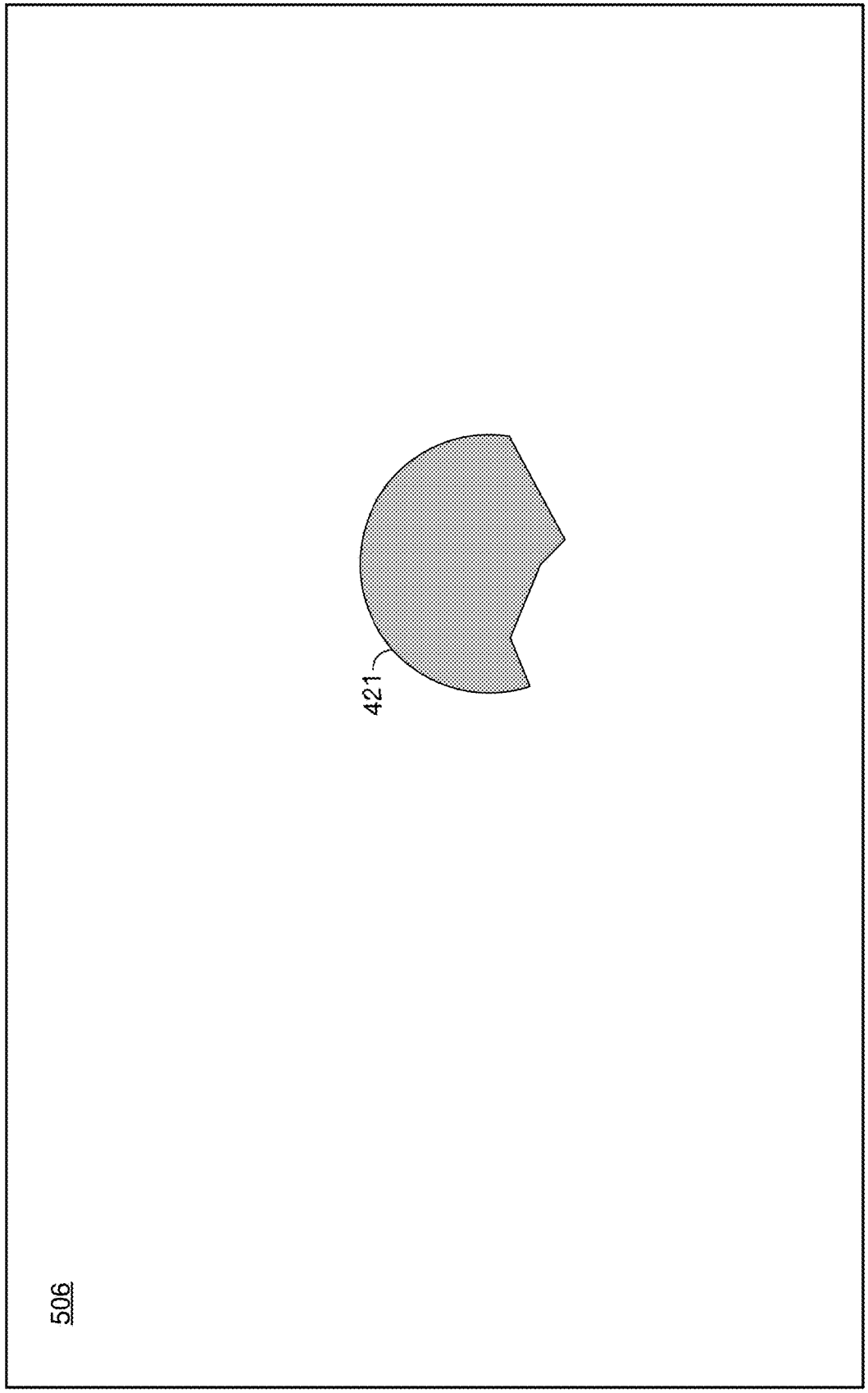
FIG. 5G illustrates an occluded image of the virtual ball based on the image of the virtual ball of FIG. 5D and the occlusion map of FIG. 5F.

FIG. 5G illustrates an occluded image of the virtual ball 506 based on the image of the virtual ball 503 of FIG. 5D and the occlusion map 505 of FIG. 5F. In various implementations, the occluded image of the virtual ball 506 includes an m×n matrix of pixels. Each pixel is associated with a respective pixel location defined by a respective row and respective column of the matrix. Each pixel is further associated with a respective pixel value. In various implementations, the pixel value is a single value, e.g., ranging from 0 to 255. In various implementations, the pixel value is an RGB triplet including a red value, green value, and blue value. In various implementations, the pixel value is an RGBA set including a red value, green value, blue value, and transparency value (or alpha value). In various implementations, pixels corresponding to regions without content include a transparency value indicating complete transparency (e.g., an alpha value of 0).

The occluded image of the virtual ball 506 includes an occluded representation of the virtual ball 421. The occluded image of the virtual ball 506 differs from image of the virtual ball 503 in that the occluded representation of the virtual ball 421 does not include a portion occluded by objects in the physical environment.

In various implementations, the occluded image of the virtual ball 506 is generated by modifying the transparency value of each pixel at a respective pixel location based on the pixel value of the corresponding pixel of the occlusion map 505. In various implementations, the transparency value is set to a value, wherein the value is 1 minus the pixel value of the corresponding pixel of the occlusion map 505. In various implementations, the transparency value is multiplied by a factor, wherein the factor is 1 minus the pixel value of the corresponding pixel of the occlusion map 505.

Figure 5H:
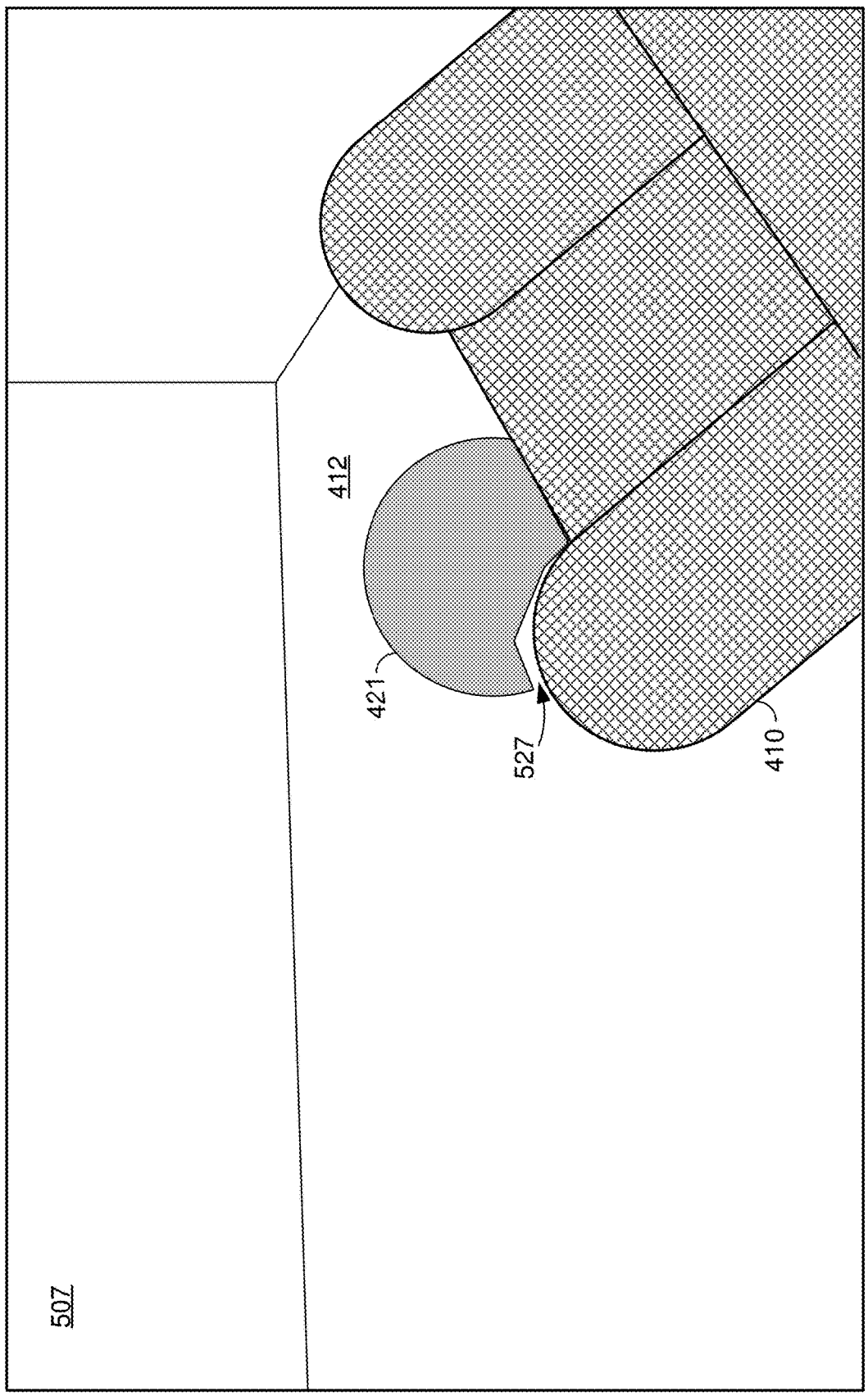
FIG. 5H illustrates a composite image based on the occluded image of the virtual ball of FIG. 5G and the image of the physical environment of FIG. 5A.

FIG. 5H illustrates a composite image 507 based on the occluded image of the virtual ball 506 of FIG. 5G and the image of the physical environment 501 of FIG. 5A. In various implementations, the composite image 507 is a composite of the occluded image of the virtual ball 506 and the image of the physical environment 501. In various implementations, the composite image 507 includes an m×n matrix of pixels. Each pixel is associated with a respective pixel location defined by a respective row and respective column of the matrix. Each pixel is further associated with a respective pixel value. In various implementations, the pixel value is a single value, e.g., ranging from 0 to 255. In various implementations, the pixel value is an RGB triplet including a red value, green value, and blue value.

In various implementations, the pixel value of a pixel of the composite image at a respective location ($C_c$) is a weighted average of the RGB value (or grayscale value) of the corresponding pixel of the occluded image of the virtual ball 506 ($C_o$) and the corresponding pixel value of the image of the physical environment 501 ($C_p$), weighted by the transparency value of the corresponding pixel of the occluded image of the virtual ball 506 ($\alpha$), e.g. $C_c = \alpha C_o + (1-\alpha)C_p$.

Notably, due to the poor correspondence between the edges of the region of the first dense depth map corresponding to the chair 510 (illustrated in FIG. 5C) and the edges of the region occupied by the representation of the chair 410 in the image of the physical environment 501 (illustrated in FIG. 5A) caused by the low resolution of the sparse depth map, the virtual ball is over-occluded, resulting in a gap 527 in FIG. 5H.

Increasing the resolution of the sparse depth map increases the correspondence between edges of the first dense depth map 502 and the image of the physical environment 501 and, therefore, decreases under-occlusion and over-occlusion. However, increasing the number of depth sensor elements of a depth sensor increases the cost of the depth sensor. Further, using a larger number of depth sensor elements of a depth sensor increases the power consumed by the depth sensor.

As noted above, in various implementations, a sparse depth map is generated by using a depth sensor including a plurality of depth sensor elements. Each depth sensor element generates a depth element of the sparse depth map for a respective location of the image of the physical environment 501.

In various implementations, the depth sensor is adjusted to change the respective locations of the image of the physical environment 501 prior to activation of the depth sensor elements to generate the sparse depth map. For example, in various implementations, a varifocal lens of the depth sensor is adjusted to bring the respective locations closer together or further apart. As another example, in various implementations, at least a portion of the depth sensor (such as a lens) is tilted to move the respective locations up, down, left, or right. Thus, the depth sensor generates a higher density of depth elements at a relevant area of the image, such as the area in which a virtual object is to be displayed (e.g., where occlusion may occur), an area surrounding a gaze of a user (e.g., where under-occlusion or over-occlusion may be noticed), or the area of a hand of a user (e.g., where occlusion may occur or be noticed in the future).

In various implementations, a subset of the depth sensor elements is selected for activation to generate the sparse depth map. For example, in various implementations, the resolution of the sparse depth map is reduced (in various implementations, to zero), in non-relevant areas. Thus, the depth sensor consumes less power by not activating depth sensor elements corresponding to non-relevant areas of the image of the physical environment 501. In various implementations, the depth sensor elements are partitioned into groups, each group including the depth sensor elements corresponding to tiles of the image of the physical environment 501. For example, in various implementations, the depth sensor elements are partitioned into an upper-left group (corresponding to the upper-left quadrant of the image of the physical environment 501), an upper-right group (corresponding to the upper-right quadrant of the image of the physical environment 501), a lower-left group (corresponding to the lower-left quadrant of the image of the physical environment 501), and a lower-right group (corresponding to the lower-right quadrant of the image of the physical environment 501). In various implementations, selecting the subset of the depth sensor elements includes selecting groups of the depth sensor elements in relevant locations or areas.

Figure 6A:
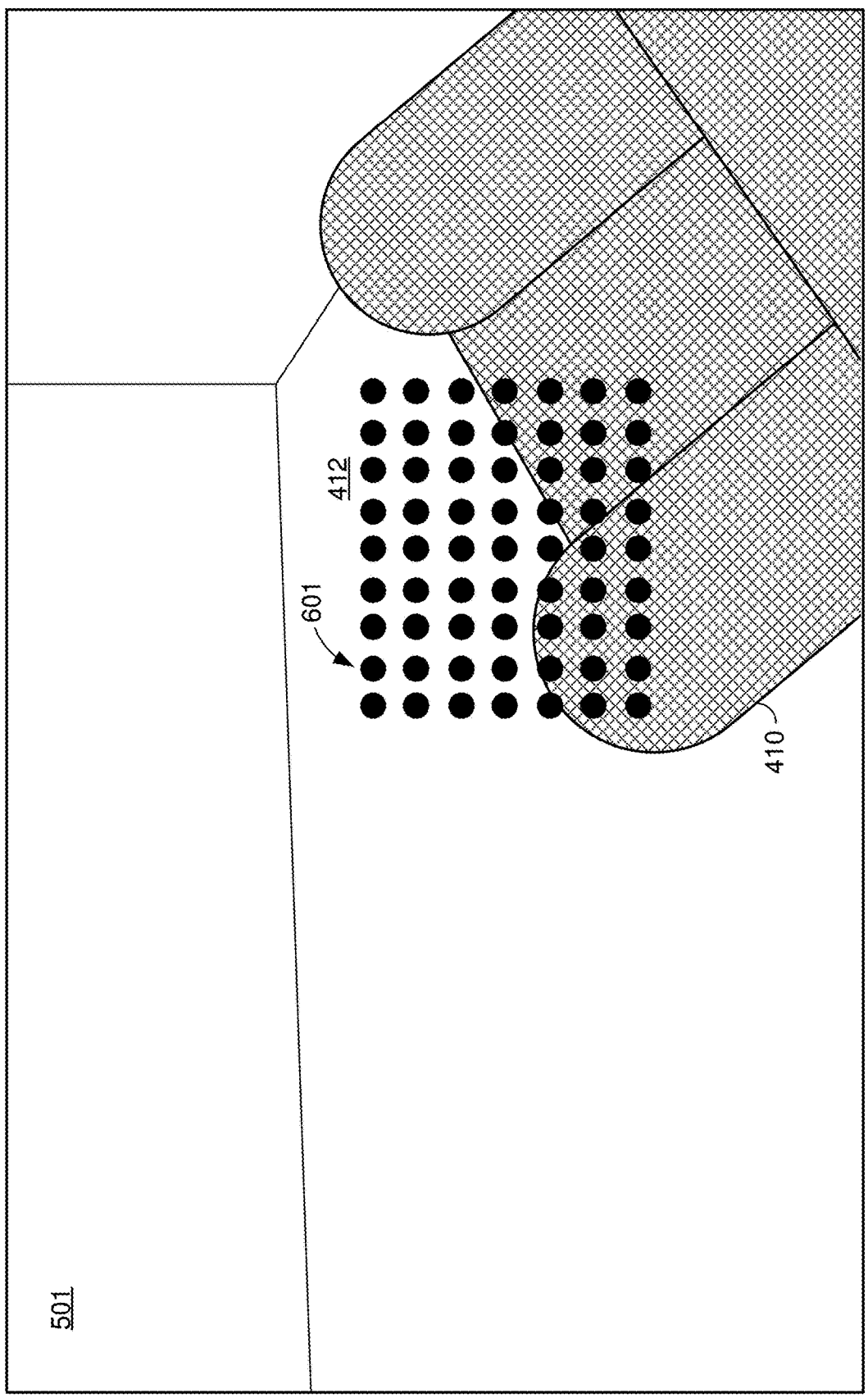
FIGS. 6A-6C illustrate the image of the physical environment of FIG. 5A with various representations of different sparse depth maps overlaid thereon.

FIG. 6A illustrates the image of the physical environment 501 of FIG. 5A with a representation of a first sparse depth map 601 overlaid thereon. The first sparse depth map includes a plurality of depth elements in an area in which the virtual ball is to be displayed. In various implementations, the first sparse depth map is generated using a depth sensor adjusted to generate depth elements over the area in which the virtual ball is to be displayed. In various implementations, the first sparse depth map is generated by selecting depth sensor elements corresponding to locations in the area in which the virtual ball is to be displayed.

Figure 6B:
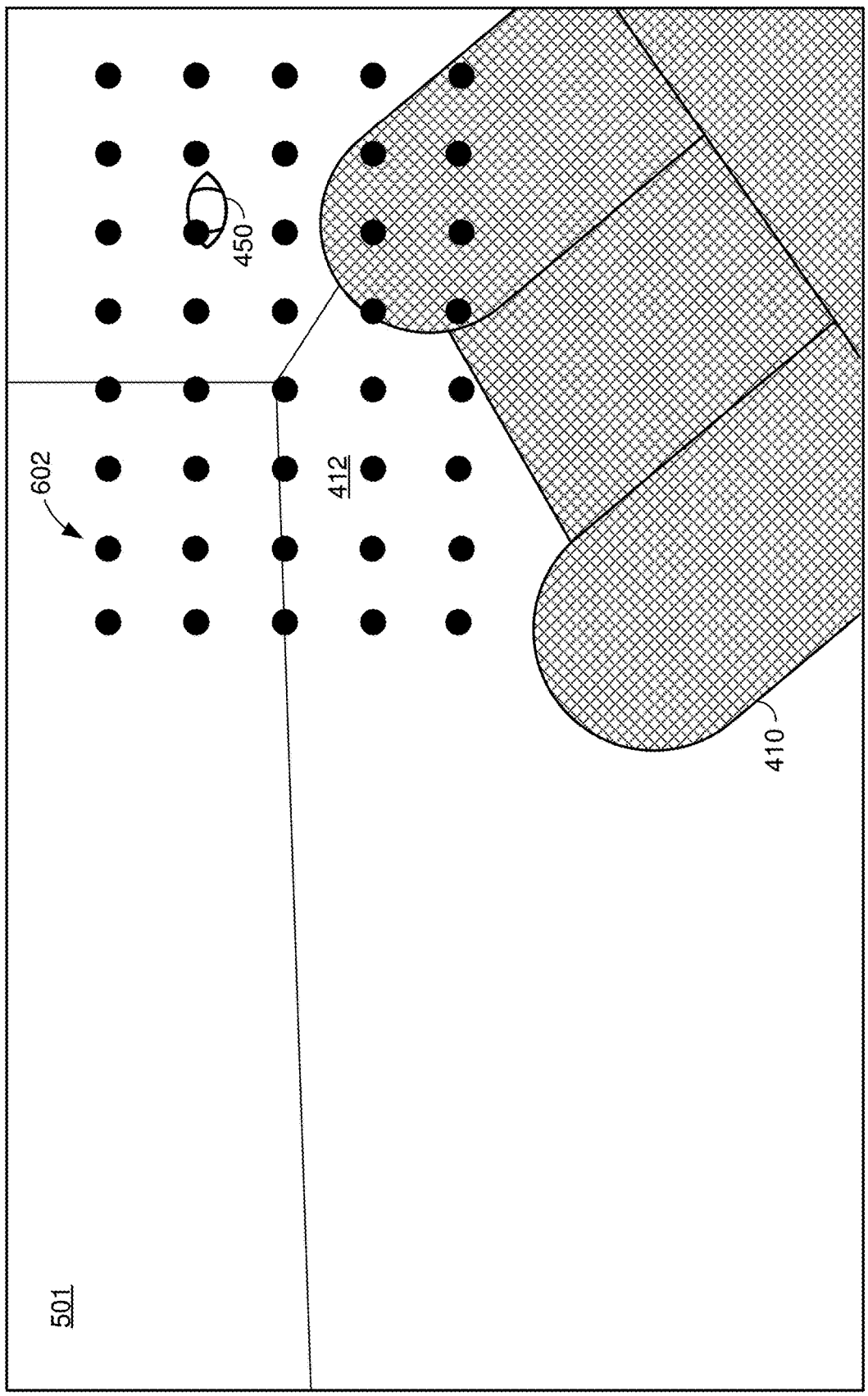

FIG. 6B illustrates the image of the physical environment 501 of FIG. 5A with a representation of a second sparse depth map 602 overlaid thereon. The second sparse depth map includes a plurality of depth elements in the upper-right quadrant of the image of the physical environment 501 in which a gaze of the user is directed (as indicated by a gaze indicator 450 also overlaid on the image of the physical environment 501). In various implementations, the second sparse depth map is generated using a depth sensor adjusted to generate depth elements over the quadrant in which the gaze of the user is directed. In various implementations, the second sparse depth map is generated by selecting a group of depth sensor elements including the location to which the gaze of the user is directed.

Figure 6C:
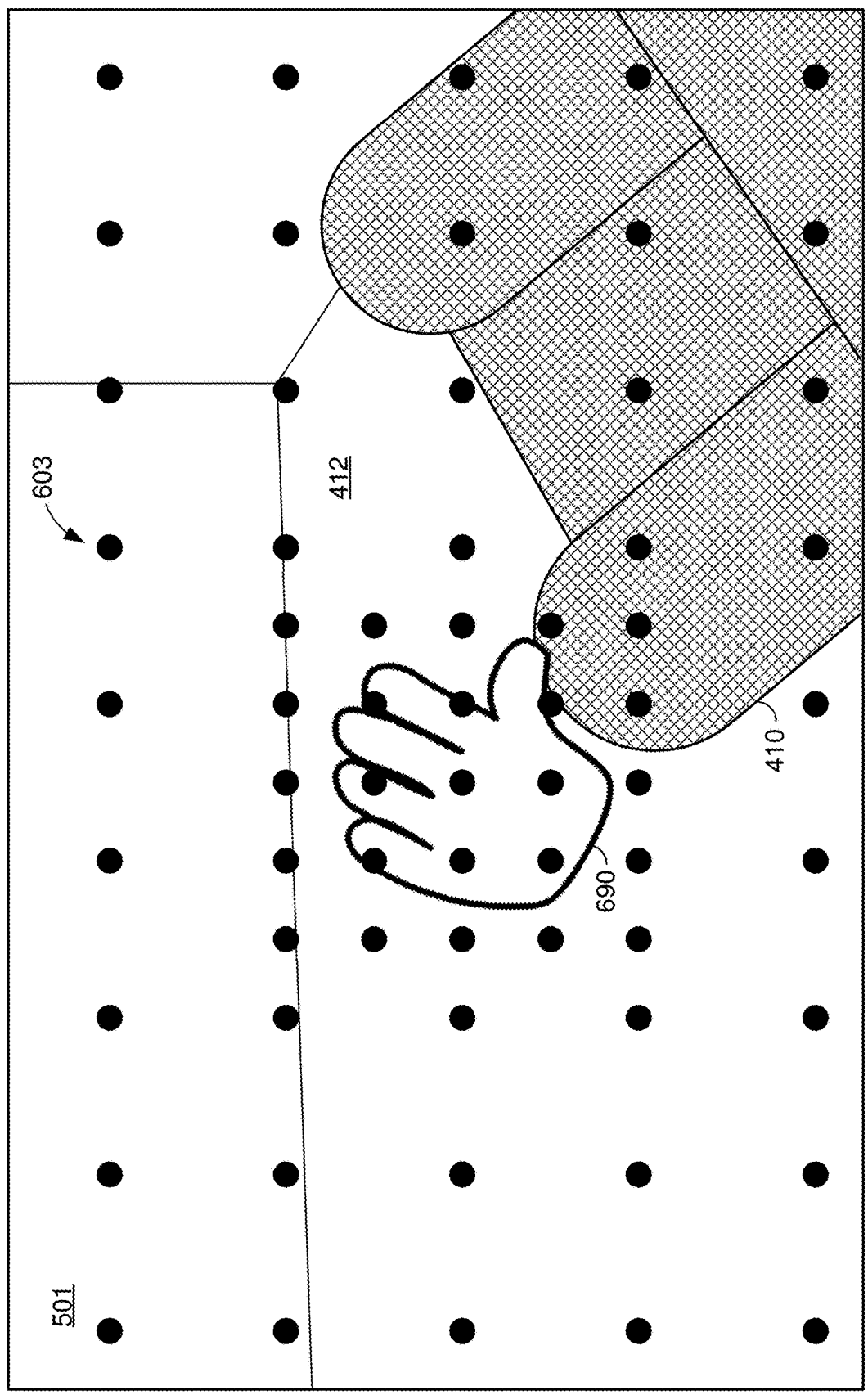

FIG. 6C illustrates the image of the physical environment 501 of FIG. 5A with a representation of a third sparse depth map 603 overlaid thereon. The third sparse depth map includes a plurality of depth elements having a higher concentration (or resolution) in the area in which the hand of user 690 is detected. In various implementations, the hand of the user 690 is detected in the image of the physical environment 501 using object recognition or gesture tracking techniques. In various implementations, the hand of the user 690 is detected using an inertial measurement unit (IMU) coupled to the hand of the user 690. In various implementations, the third sparse depth map is generated using a depth sensor adjusted to generate depth elements having a higher concentration in the area in which the hand of the user 690 is detected. In various implementations, the third sparse depth map is generated by selecting a greater concentration of depth sensor elements corresponding to locations in the area in which the hand of the user 690 than depth sensor elements corresponding to locations outside the area in which the hand of the user 690 is detected. Thus, the percentage of depth sensor elements selected within the area is greater than the percentage of depth sensor elements selected outside of the area.

Any of the sparse depth maps (or properties thereof) can be used when selection is based on location of virtual objects, gaze, object recognition, or other heuristics. For example, when a virtual object is at a location, the second sparse depth map 602 (selecting a group of depth sensor elements corresponding to an area including the location without selecting other depth sensor elements) or the third sparse depth map 603 (selecting a greater percentage of depth sensor elements inside an area including the location than outside the area) can be used. As another example, when gaze is directed to a location, the first sparse depth map 601 (selecting depth sensor elements in an area surrounding the location without selecting other depth sensor elements) or the third sparse depth map 603 can be used. As another example, when a real object is at a location, the first sparse depth map 601 or the second sparse depth map 602 can be used.

FIG. 7 is a flowchart representation of a method 700 of activating a depth sensor in accordance with some implementations. In various implementations, the method 700 is performed by a device with a depth sensor including a plurality of depth sensor elements, a display, one or more processors, and non-transitory memory (e.g., the electronic device 120 of FIG. 3). In some implementations, the method 700 is performed by processing logic, including hardware, firmware, software, or a combination thereof. In some implementations, the method 700 is performed by a processor executing instructions (e.g., code) stored in a non-transitory computer-readable medium (e.g., a memory).

The method 700 begins, in block 710, with the device obtaining content to be displayed on the display in association with a physical environment. For example, FIG. 5D illustrates an image of a virtual ball 503. In various implementations, the display is an opaque display and the content is displayed in association with the physical environment as a composite image of at least a portion of the content and an image of the physical environment. For example, FIG. 5H illustrates a composite image 507 including the occluded representation of the virtual ball 421 composited with the image of the physical environment 501 of FIG. 5A. In various implementations, the display is a transparent display and the virtual content is displayed in association with the physical environment as a projection over a view of the physical environment.

The method 700 continues, in block 720, with the device selecting a subset of the plurality of depth sensor elements. In various implementations, selecting the subset of the plurality of depth sensor elements is based on the content. In various implementations, the content is to be displayed over an area of the display, each of the plurality of depth sensor elements corresponds to an element location on the display, and a depth sensor element of the plurality of depth sensor elements is more likely to be selected if the corresponding element location is within the area. For example, FIG. 6A illustrates a sparse depth map generated by selecting depth sensor elements having corresponding element locations in an area in which the virtual ball is to be displayed.

In various implementations, selecting the subset of the plurality of depth sensor elements is based on a gaze of a user. In various implementations, the gaze of the user corresponds to a gaze location on the display, each of the plurality of depth sensor elements corresponds to an element location on the display, and a depth sensor element of the plurality of depth sensor elements is more likely to be selected if the corresponding element location is within a threshold distance of the gaze location. For example, FIG. 6B illustrates a sparse depth map generated by selecting depth sensor elements having corresponding element locations in a quadrant of a gaze location of a gaze of the user.

In various implementations, selecting the subset of the plurality of depth sensor elements is based on a body pose of a user. In various implementations, selecting the subset of the plurality of depth sensor elements is based on a hand position of a user. In various implementations, the hand position of the user corresponds to a hand area of the display, wherein each of the plurality of depth sensor elements corresponds to an element location on the display, and wherein a depth sensor element of the plurality of depth sensor elements is more likely to be selected if the corresponding element location is within the hand area of the display. For example, FIG. 6C illustrates a sparse depth map generated by preferentially selecting depth sensor elements having corresponding element locations in a hand area of the display.

In various implementations, selecting the subset of the plurality of depth sensor elements is based on a stored depth map of the scene stored in the non-transitory memory. In various implementations, selecting the subset of the plurality of depth sensor elements is based on pixel locations of depth elements of the stored depth map. For example, if the stored depth map includes depth elements for pixel locations on the right side of the display, depth sensor elements for element locations on the left side of the display are selected to generate a complete depth map. In various implementations, selecting the subset of the plurality of depth sensor elements is based on pixel times of elements of the stored depth map. For example, if the stored depth map includes a first set of depth elements for pixel locations on the right side of the display associated with a first capture time and a second set of depth elements for pixel locations on the left side of the display associated with a second capture time, depth sensor elements for element locations on side of the display least recently captured are selected.

In various implementations, selecting the subset of the plurality of depth sensor elements is based on a dynamism of the physical environment. For example, if the physical environment is more dynamic, more depth sensor elements are selected than if the physical environment is static.

In various implementations, selecting the subset of the plurality of depth sensor elements is based on an amount of available power. For example, if a battery level is low, fewer depth sensor elements are selected than if the battery level is high.

In various implementations, each of the plurality of depth sensor elements corresponds to an element location on the display. In various implementations, selecting the subset of the plurality of depth sensor elements includes selecting depth sensor elements with corresponding element locations within a contiguous area without selecting depth sensor elements with corresponding element locations outside of the contiguous area. In various implementations, selecting the subset of the plurality of depth sensor elements includes selecting a higher percentage of the depth sensor elements with corresponding element locations within a contiguous area than the percentage of depth sensor elements selected with corresponding element locations outside of the contiguous area.

The method 700 continues, in block 730, with the device activating the subset of the plurality of depth sensor elements to obtain a depth map of the physical environment. For example, FIG. 5B illustrates a representation of a sparse depth map 530 which may be generated with a depth sensor. As another example, FIG. 5C illustrates a dense depth map 502 based on the sparse depth map 530 of FIG. 5B.

In various implementations, activating the subset of the plurality of depth sensor elements to obtain a depth map of the physical environment excludes activating others of the plurality of depth sensor elements. In various implementations, the depth map of the physical environment is based on the output of the subset of the plurality of depth sensor elements without being based on others of the plurality of depth sensor elements.

The method 700 continues, in block 740, with the device displaying, on the display, at least a portion of the content based on the depth map of the physical environment. For example, FIG. 5H illustrates a composite image 507 including the occluded representation of the virtual ball 421 composited with the image of the physical environment 501 of FIG. 5A.

Thus, in various implementations, power consumption by depth sensor elements of the depth sensor is balanced with the usefulness (or importance, worth, or significance) of the depth elements of the generated depth map. Accordingly, in various implementations, depth sensor elements are not activated (or, at least, few depth sensor elements are activated) to generate depth elements that are not used (e.g., to determine if occlusion is to occur), are not noticed (e.g., where the user is not looking), or redundant (e.g., previously determined and stored and unchanging).

While various aspects of implementations within the scope of the appended claims are described above, it should be apparent that the various features of implementations described above may be embodied in a wide variety of forms and that any specific structure and/or function described above is merely illustrative. Based on the present disclosure one skilled in the art should appreciate that an aspect described herein may be implemented independently of any other aspects and that two or more of these aspects may be combined in various ways. For example, an apparatus may be implemented and/or a method may be practiced using any number of the aspects set forth herein. In addition, such an apparatus may be implemented and/or such a method may be practiced using other structure and/or functionality in addition to or other than one or more of the aspects set forth herein.

It will also be understood that, although the terms "first," "second," etc. may be used herein to describe various elements, these elements should not be limited by these terms. These terms are only used to distinguish one element from another. For example, a first node could be termed a second node, and, similarly, a second node could be termed a first node, which changing the meaning of the description, so long as all occurrences of the "first node" are renamed consistently and all occurrences of the "second node" are renamed consistently. The first node and the second node are both nodes, but they are not the same node.

The terminology used herein is for the purpose of describing particular implementations only and is not intended to be limiting of the claims. As used in the description of the implementations and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

What is claimed is:

1. A method comprising:
 at a device including a depth sensor including a plurality of depth sensor elements, a display having a plurality of display locations, one or more processors, and non-transitory memory:
 obtaining content to be displayed on the display in association with a physical environment;
 selecting a subset of the plurality of depth sensor elements corresponding to a subset of the plurality of display locations;
 activating the subset of the plurality of depth sensor elements corresponding to the subset of the plurality of display locations without activating others of the plurality of depth sensor elements to obtain a depth map of the physical environment; and
 displaying, on the display, at least a portion of the content based on the depth map of the physical environment.

2. The method of claim 1, wherein selecting the subset of the plurality of depth sensor elements is based on the content.

3. The method of claim 2, wherein the content is to be displayed over an area of the display, wherein each of the plurality of depth sensor elements corresponds to a respective one of the plurality of display locations, and wherein a depth sensor element of the plurality of depth sensor elements is more likely to be selected if the corresponding respective one of the plurality of display locations is within the area.

4. The method of claim 1, wherein selecting the subset of the plurality of depth sensor elements is based on a gaze of a user.

5. The method of claim 4, wherein the gaze of the user corresponds to a gaze location on the display, wherein each of the plurality of depth sensor elements corresponds to a respective one of the plurality of display locations, and wherein a depth sensor element of the plurality of depth sensor elements is more likely to be selected if the corresponding respective one of the plurality of display locations is within a threshold distance of the gaze location.

6. The method of claim 1, wherein selecting the subset of the plurality of depth sensor elements is based on a body pose of a user.

7. The method of claim 6, wherein selecting the subset of the plurality of depth sensor elements is based on a hand position of the user.

8. The method of claim 7, wherein the hand position of the user corresponds to a hand area of the display, wherein each of the plurality of depth sensor elements corresponds to a respective one of the plurality of display locations, and wherein a depth sensor element of the plurality of depth sensor elements is more likely to be selected if the corresponding respective one of the plurality of display locations is within the hand area of the display.

9. The method of claim 1, wherein selecting the subset of the plurality of depth sensor elements is based on a stored depth map of the physical environment stored in the non-transitory memory.

10. The method of claim 9, wherein selecting the subset of the plurality of depth sensor elements is based on pixel locations of depth elements of the stored depth map.

11. The method of claim 9, wherein selecting the subset of the plurality of depth sensor elements is based on pixel times of elements of the stored depth map.

12. The method of claim 1, wherein selecting the subset of the plurality of depth sensor elements is based on a dynamism of the physical environment.

13. The method of claim 1, wherein selecting the subset of the plurality of depth sensor elements is based on an amount of available power.

14. The method of claim 1, wherein the depth map of the physical environment is based on the output of the subset of the plurality of depth sensor elements without being based on others of the plurality of depth sensor elements.

15. A device comprising:
- a depth sensor including a plurality of depth sensor elements;
- a display having a plurality of display locations;
- a non-transitory memory; and
- one or more processors to:
  - obtain content to be displayed on the display in association with a physical environment;
  - select a subset of the plurality of depth sensor elements corresponding to a subset of the plurality of display locations;
  - activate the subset of the plurality of depth sensor elements corresponding to the subset of the plurality of display locations without activating others of the plurality of depth sensor elements to obtain a depth map of the physical environment; and
  - display, on the display, at least a portion of the content based on the depth map of the physical environment.

16. The device of claim 15, wherein the one or more processors select the subset of the plurality of depth sensor elements based on the content.

17. The device of claim 15, wherein the one or more processors select the subset of the plurality of depth sensor elements based on a gaze of a user.

18. The device of claim 15, wherein the one or more processors select the subset of the plurality of depth sensor elements based on an amount of available power.

19. A non-transitory computer-readable medium having instructions encoded thereon which, when executed by one or more processors of a device including a depth sensor including a plurality of depth sensor elements and a display having a plurality of display locations, cause the device to:
- obtain content to be displayed on the display in association with a physical environment;
- select a subset of the plurality of depth sensor elements corresponding to a subset of the plurality of display locations;
- activate the subset of the plurality of depth sensor elements corresponding to the subset of the plurality of display locations without activating others of the plurality of depth sensor elements to obtain a depth map of the physical environment; and
- display, on the display, at least a portion of the content based on the depth map of the physical environment.

* * * * *